United States Patent
Saito et al.

(10) Patent No.: US 9,871,417 B2
(45) Date of Patent: Jan. 16, 2018

(54) ROTATING ELECTRIC MACHINE AND VEHICLE EQUIPPED WITH ROTATING ELECTRIC MACHINE

(71) Applicant: Hitachi Automotive Systems, Ltd., Hitachinaka-shi, Ibaraki (JP)

(72) Inventors: Yasuyuki Saito, Hitachinaka (JP); Hiroshi Hamano, Hitachinaka (JP); Ryoji Kobayashi, Hitachinaka (JP); Taisuke Ikeda, Hitachinaka (JP); Yuji Kano, Hitachinaka (JP)

(73) Assignee: Hitachi Automotive Systems, Ltd., Hitachinaka-shi (JP)

( * ) Notice: Subject to any disclaimer, the term of this patent is extended or adjusted under 35 U.S.C. 154(b) by 748 days.

(21) Appl. No.: 14/372,632

(22) PCT Filed: Jan. 9, 2013

(86) PCT No.: PCT/JP2013/050183
§ 371 (c)(1),
(2) Date: Jul. 16, 2014

(87) PCT Pub. No.: WO2013/108680
PCT Pub. Date: Jul. 25, 2013

(65) Prior Publication Data
US 2014/0361646 A1 Dec. 11, 2014

(30) Foreign Application Priority Data
Jan. 19, 2012 (JP) .................................. 2012-008565

(51) Int. Cl.
*H02K 3/28* (2006.01)
*H02K 1/24* (2006.01)
(Continued)

(52) U.S. Cl.
CPC .............. *H02K 1/24* (2013.01); *B60L 11/123* (2013.01); *B60L 11/14* (2013.01); *B60L 15/007* (2013.01);
(Continued)

(58) Field of Classification Search
CPC .......... H02K 3/28; H02K 21/14; H02K 21/16; H02K 1/27
(Continued)

(56) References Cited

U.S. PATENT DOCUMENTS 6,894,417 B2    5/2005  Cai et al.
2001/0040416 A1  11/2001  Nakamura et al.
(Continued)

FOREIGN PATENT DOCUMENTS

DE  103 21 956 A1   3/2004
EP  2 348 611 A1    7/2011
(Continued)

OTHER PUBLICATIONS

JP05227688 A abstract translation Mar. 28, 2017.*
(Continued)

*Primary Examiner* — Hanh Nguyen
*Assistant Examiner* — Leda Pham
(74) *Attorney, Agent, or Firm* — Crowell & Moring LLP

(57) ABSTRACT

A rotating electric machine, in which a cross conductors of a stator connect slot conductors so as to stride N+1 slots at coil ends on one side and stride N−1 slots at coil ends on another side, with N representing a number of slots per pole, a stator winding includes a plurality of slot conductor groups each made up with a plurality of slot conductors corresponding to a single phase, the plurality of slot conductors in each slot conductor group are inserted at a predetermined number Ns of successive slots forming a continuous range along a circumference of the stator core so that the slot conductors
(Continued)

in the slot conductor group take successive slot positions and successive layer positions, Ns=NSPP+NL when NSPP represents a number of slots per pole per phase and a number of layers is expressed as 2×NL.

11 Claims, 32 Drawing Sheets

(51) Int. Cl.
    *H02K 29/03*      (2006.01)
    *H02K 1/02*      (2006.01)
    *H02K 1/27*      (2006.01)
    *H02K 3/16*      (2006.01)
    *H02K 16/00*      (2006.01)
    *H02K 3/20*      (2006.01)
    *B60L 11/12*      (2006.01)
    *B60L 11/14*      (2006.01)
    *B60L 15/00*      (2006.01)
    *B60L 15/20*      (2006.01)

(52) U.S. Cl.
CPC ............... *B60L 15/20* (2013.01); *H02K 1/02* (2013.01); *H02K 1/2706* (2013.01); *H02K 1/276* (2013.01); *H02K 3/16* (2013.01); *H02K 3/20* (2013.01); *H02K 3/28* (2013.01); *H02K 16/00* (2013.01); *H02K 29/03* (2013.01); *B60L 2210/40* (2013.01); *B60L 2220/18* (2013.01); *B60L 2220/50* (2013.01); *B60L 2240/421* (2013.01); *B60L 2270/145* (2013.01); *H02K 2201/06* (2013.01); *H02K 2213/03* (2013.01); *Y02T 10/6217* (2013.01); *Y02T 10/641* (2013.01); *Y02T 10/645* (2013.01); *Y02T 10/7077* (2013.01); *Y02T 10/7241* (2013.01); *Y02T 10/7275* (2013.01)

(58) Field of Classification Search
USPC ........................................................ 310/207
See application file for complete search history.

(56) References Cited

U.S. PATENT DOCUMENTS

| | | | |
|---|---|---|---|
| 2007/0018525 A1* | 1/2007 | Cai | H02K 3/28 310/184 |
| 2008/0224558 A1* | 9/2008 | Ionel | H02K 1/2766 310/156.57 |
| 2009/0224627 A1* | 9/2009 | Hino | H02K 1/276 310/216.077 |
| 2009/0230802 A1 | 9/2009 | Kamiya et al. | |
| 2011/0254474 A1 | 10/2011 | Saito et al. | |
| 2013/0113330 A1 | 5/2013 | Saito et al. | |

FOREIGN PATENT DOCUMENTS

| | | | |
|---|---|---|---|
| JP | 5-227688 A | | 9/1993 |
| JP | 05227688 A | * | 9/1993 |
| JP | 2001-169490 A | | 6/2001 |
| JP | 2004-364464 A | | 12/2004 |
| JP | 2004364464 A | * | 12/2004 |
| JP | 2008-141803 A | | 6/2008 |
| JP | 2010-98830 A | | 4/2010 |
| JP | 2011-83188 A | | 4/2011 |
| JP | 2013-176292 A | | 9/2013 |
| WO | WO 2012/011493 A1 | | 1/2012 |

OTHER PUBLICATIONS

JP 2004364464 A machine translation Mar. 28, 2017.*
International Search Report (PCT/ISA/210) dated Feb. 26, 2013, with English translation (Five (5) pages).
German Office Action dated Oct. 28, 2014, including partial English translation (twelve (12) pages).
Japanese Office Action issued in counterpart Japanese Application No. 2016-110559 dated Feb. 14, 2017 with English translation (seven pages).

\* cited by examiner (a)

(b)

(a)

(b)

ROTATING ELECTRIC MACHINE AND VEHICLE EQUIPPED WITH ROTATING ELECTRIC MACHINE

TECHNICAL FIELD

The present invention relates to a rotating electric machine and a vehicle equipped with the rotating electric machine.

BACKGROUND ART

The winding technologies adopted in conjunction with rotating electric machines used to drive vehicles include that disclosed in patent literature 1. In addition, the technologies pertaining to rotors known in the related art include the art disclosed in patent literature 2.

CITATION LIST

Patent Literature

Patent literature 1: U.S. Pat. No. 6,894,417
Patent literature 2: Japanese Laid Open Patent Publication No. 2010-98830

SUMMARY OF INVENTION

Technical Problem

A rotating electric machine mounted in an electric vehicle or the like is required to operate without generating any significant noise. Accordingly, an object of the present invention is to achieve noise reduction in a rotating electric machine.

Solution to Problem

According to one aspect of the present invention, a rotating electric machine, comprises: a stator core having a plurality of slots formed therein; a stator winding assuming a plurality of phases, which includes a plurality of coil windings wound with a wave winding pattern, each made up with slot conductors each inserted at one of the slots at the stator core to form one of a plurality of layers and cross conductors each connecting same-side ends of slot conductors inserted at different slots so as to form a coil end; and a rotor rotatably disposed via an air gap so as to be allowed to rotate relative to the stator core, which includes a plurality of magnets and a plurality of magnetic auxiliary salient pole portions each formed between poles formed with the magnets, wherein: the cross conductors connect the slot conductors so as to run astride slots with a slot pitch Np set to N+1 at coil ends on one side and run astride slots with the slot pitch Np set to N−1 at coil ends on another side, with N representing a number of slots per pole; the stator winding includes a plurality of slot conductor groups each made up with a plurality of slot conductors corresponding to a single phase; the plurality of slot conductors in each slot conductor group are inserted at a predetermined number Ns of successive slots forming a continuous range along a circumference of the stator core so that the slot conductors in the slot conductor group take successive slot positions and successive layer positions; and the predetermined number Ns is set so that Ns=NSPP+NL when NSPP represents a number of slots per pole per phase and a number of layers is expressed as 2×NL; the rotor includes magnetic resistance-altering portions located at positions each offset along a circumferential direction from a q-axis passing through a center of a salient pole at a corresponding magnetic auxiliary salient pole portion within the magnetic auxiliary salient portion; and extents to which the magnetic resistance-altering portions are offset from the q-axis vary depending upon positions assumed by the magnetic auxiliary salient poles so that torque pulsations occurring in a applying current state cancel each other out.

According to another aspect of the present invention, a vehicle, comprises: a rotating electric machine according to any one of the first through tenth aspects; a battery that provides DC power; and a conversion device that converts the DC power originating from the battery to AC power and provides the AC power to the rotating electric machine, wherein: torque generated in the rotating electric machine is used as a drive force to drive the vehicle.

Advantageous Effect of the Invention

According to the present invention, noise reduction can be achieved in a rotating electric machine and a vehicle equipped with the rotating electric machine.

DESCRIPTION OF EMBODIMENTS

The following is a description of embodiments of the present invention, given in reference to the drawings.

First Embodiment

The rotating electric machine according to the present invention achieves noise reduction by reducing the extent of torque ripple. For this reason, it is ideal in applications in which it is used as a traveling motor for an electric vehicle. While the rotating electric machine according to the present invention may be adopted in a pure electric vehicle engaged in traveling operation exclusively on a rotating electric machine or in a hybrid type electric vehicle driven both by an engine and a rotating electric machine, the following description will be given by assuming that the present invention is adopted in a hybrid type electric vehicle.

Figure 1:
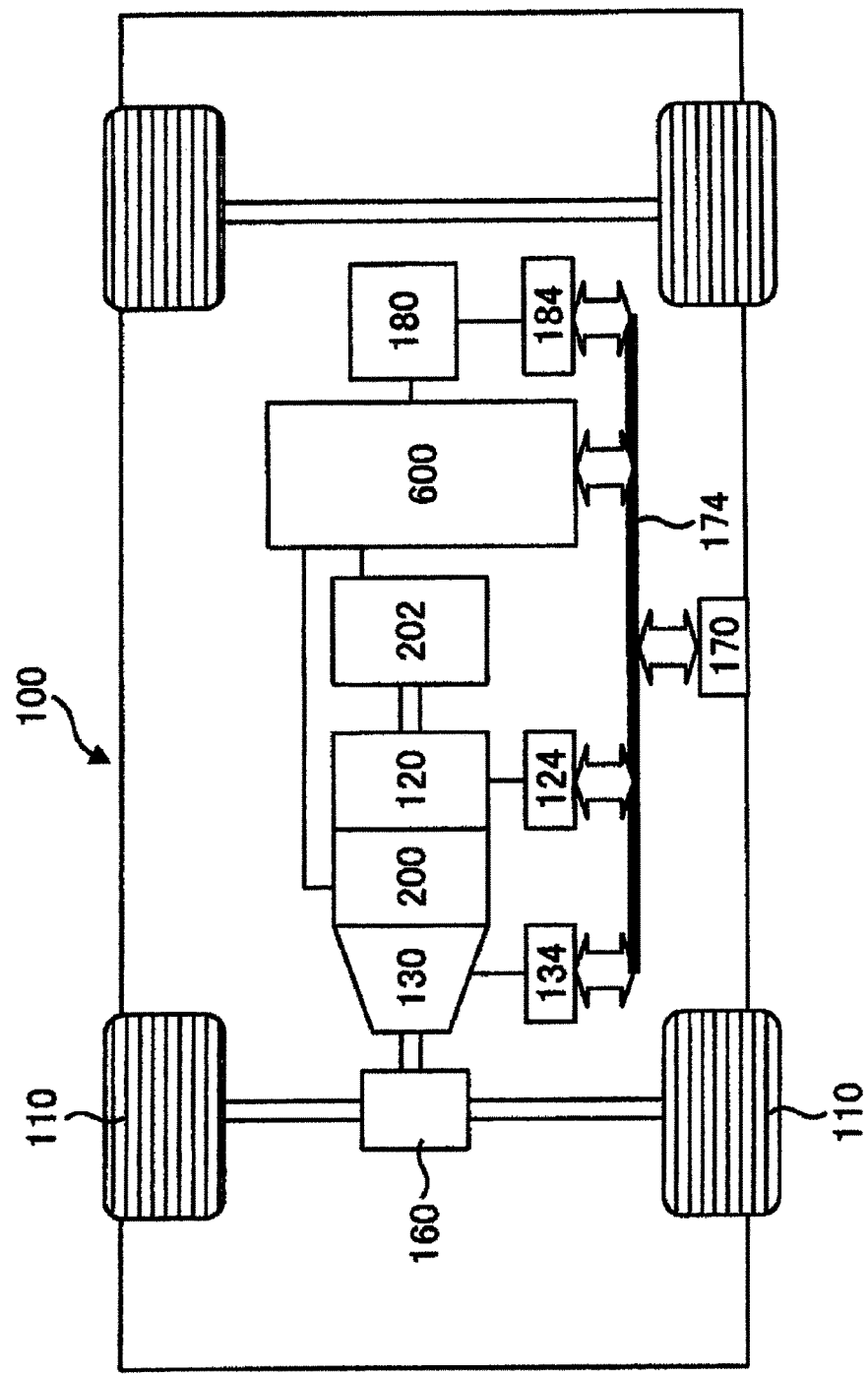
FIG. 1 A schematic diagram showing the structure of a hybrid electric vehicle

FIG. 1 is a schematic illustration showing the structure of a hybrid type electric vehicle having installed therein rotating electric machines achieved in an embodiment. An engine 120, a first rotating electric machine 200, a second rotating electric machine 202 and a battery 180 are mounted at a vehicle 100. When a drive force imparted by the rotating electric machines 200 and 202 is required, the battery 180 provides DC power to a power conversion device 600, which converts the DC power to AC power and supplies the AC power to the rotating electric machines 200 and 202. In addition, during a regenerative traveling operation, AC power generated at the rotating electric machines 200 and 202 is supplied to the power conversion device 600, which converts the AC power to DC power and supplies the DC power to the battery 180. The DC power from and into the battery 180 with the rotating electric machines 200 and 202 are performed by exchanging via the power conversion device 600. In addition, although not shown, a battery that provides low-voltage power (e.g., 14 V power) is installed in the vehicle so as to supply DC power to the control circuits to be described below.

Rotational torque generated via the engine 120 and the rotating electric machines 200 and 202 is transmitted to front wheels 110 via a transmission 130 and a differential gear unit 160. The transmission 130 is controlled by a transmission control device 134, whereas the engine 120 is controlled by an engine control device 124. The battery 180 is controlled by a battery control device 184. The transmission control device 134, the engine control device 124, the battery control device 184, the power conversion device 600 and an integrated control device 170 are connected with one another via a communication line 174.

The integrated control device 170, which is a higher order control device relative to the transmission control device 134, the engine control device 124, the power conversion device 600 and the battery control device 184, receives, via the communication line 174, information originating from the transmission control device 134, the engine control device 124, the power conversion device 600 and the battery control device 184, indicating the statuses at the individual lower-order control devices. Based upon the information thus received, the integrated control device 170 generates, through arithmetic operation, a control command for each corresponding control device. The control command generated through the arithmetic operation is then transmitted to the particular control device via the communication line 174.

The high-voltage battery 180, constituted with secondary battery cells such as lithium ion battery cells or nickel hydride battery cells, is capable of outputting high-voltage DC power in a range of 250 to 600 V or higher. The battery control device 184 outputs, via the communication line 174, information indicating the state of charge/discharge in the battery 180 and the states of the individual battery cell units constituting the battery 180 to the integrated control device 170.

Upon judging, based upon the information provided by the battery control device 184, that the battery 180 needs to be charged, the integrated control device 170 issues a power generation operation instruction for the power conversion device 600. The primary functions of the integrated control device 170 further include management of torque output from the engine 120 and the rotating electric machines 200 and 202, arithmetic processing executed to calculate the overall torque representing the sum of the torque output from the engine 120 and the torques output from the rotating electric machines 200 and 202, and to calculate a torque distribution ratio, and transmission of control commands generated based upon the arithmetic processing results to the transmission control device 134, the engine control device 124 and the power conversion device 600. Based upon a torque command issued by the integrated control device 170, the power conversion device 600 controls the rotating electric machines 200 and 202 so as to output torque or generate power as indicated in the command.

The power conversion device 600 includes power semiconductors that constitute inverters via which the rotating electric machines 200 and 202 are engaged in operation. The power conversion device 600 controls switching operation of the power semiconductors based upon a command issued by the integrated control device 170. As the power semiconductors are engaged in the switching operation as described above, the rotating electric machines 200 and 202 are each driven to operate as an electric motor or as a power generator.

When engaging the rotating electric machines 200 and 202 in operation as electric motors, DC power provided from the high-voltage battery 180 is supplied to DC terminals of the inverters in the power conversion device 600. The power conversion device 600 controls the switching operation of the power semiconductors so as to convert the DC power supplied to the inverters to three-phase AC power and provides the three-phase AC power to the rotating electric machines 200 and 202. When engaging the rotating electric machines 200 and 202 in operation as generators, the rotors of the rotating electric machines 200 and 202 are rotationally driven with a rotational torque applied thereto from the outside and thus, three-phase AC power is generated at the stator windings of the rotating electric machines 200 and 202. The three-phase AC power thus generated is converted to DC power in the power conversion device 600 and the high-voltage battery 180 is charged with the DC power supplied thereto.

Figure 2:
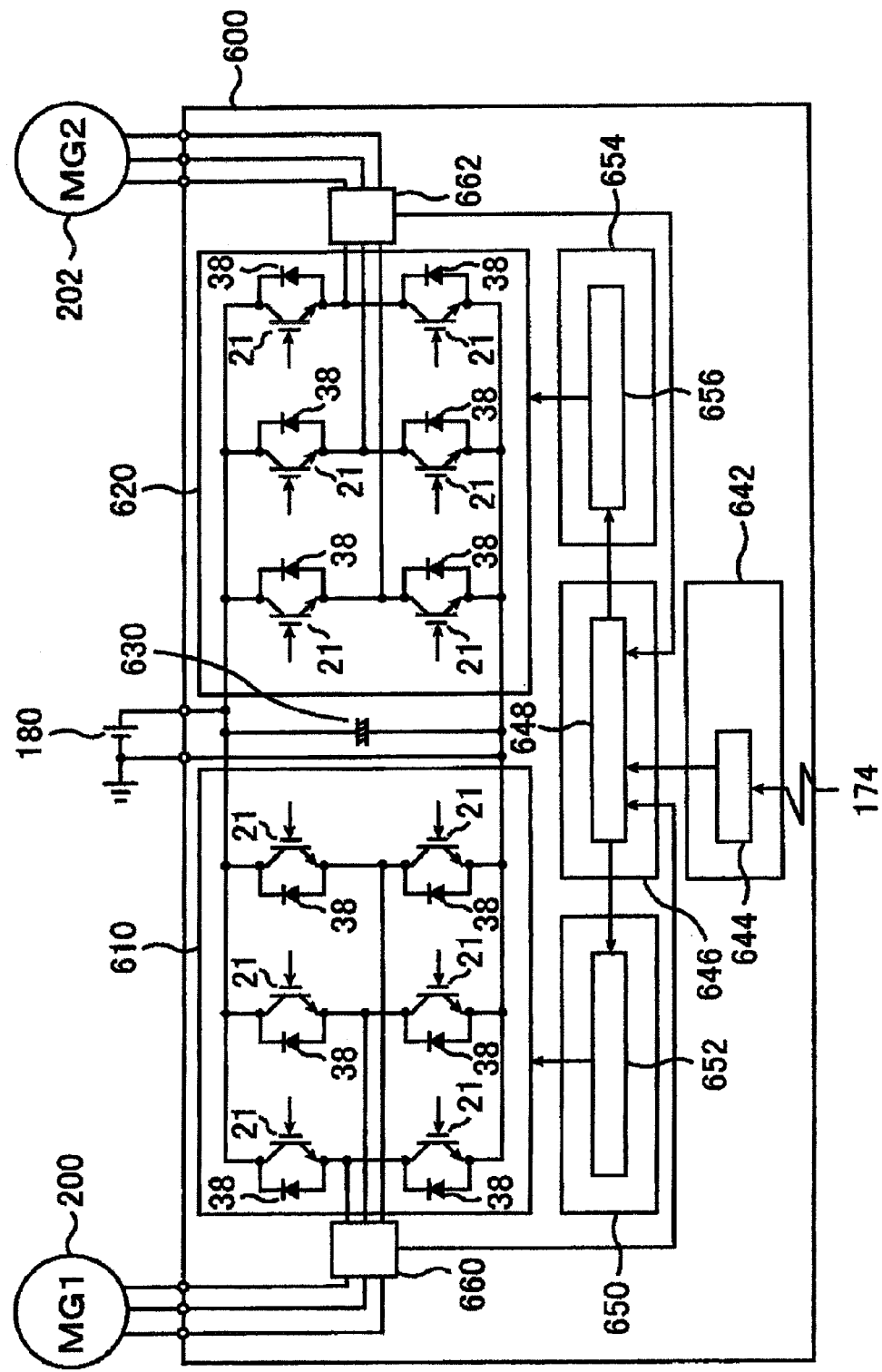
FIG. 2 A circuit diagram pertaining to the power conversion device 600

FIG. 2 is a circuit diagram pertaining to the power conversion device 600 shown in FIG. 1. The power conversion device 600 includes a first inverter device for the rotating electric machine 200 and a second inverter device for the rotating electric machine 202. The first inverter device comprises a power module 610, a first drive circuit 652 that controls switching operation of power semiconductors 21 in the power module 610 and a current sensor 660 that detects an electric current at the rotating electric machine 200. The drive circuit 652 is disposed at a drive circuit substrate 650.

The second inverter device comprises a power module 620, a second drive circuit 656 that controls switching operation of power semiconductors 21 in the power module 620 and a current sensor 662 that detects an electric current at the rotating electric machine 202. The drive circuit 656 is disposed at a drive circuit substrate 654. A control circuit 648 disposed at a control circuit substrate 646, a capacitor module 630 and a transmission/reception circuit 644 mounted at a connector substrate 642 are all shared by the first inverter device and the second inverter device.

The power modules 610 and 620 are engaged in operation with drive signals output from the corresponding drive circuits 652 and 656. The power modules 610 and 620 each convert the DC power provided from the battery 180 to three-phase AC power and provide the three-phase AC power resulting from the conversion to a stator winding constituting an armature winding of the corresponding rotating electric machine 200 or 202. In addition, the power modules 610 and 620 convert AC power induced at the stator windings of the rotating electric machines 200 and 202 to DC power and provide the DC power resulting from the conversion to the battery 180.

As indicated in FIG. 2, the power modules 610 and 620 each include a three-phase bridge circuit constituted with serial circuits, each corresponding to one of the three phases, electrically connected in parallel between the positive side and the negative side of the battery 180. Each serial circuit includes a power semiconductor 21 constituting an upper arm and a power semiconductor 21 constituting a lower arm, and these power semiconductors 21 are connected in series. Since the power module 610 and the power module 620 adopt circuit structures substantially identical to each other as shown in FIG. 2, the following description focuses on the power module 610 chosen as a representative example.

The switching power semiconductor elements used in the embodiment are IGBTs (insulated gate bipolar transistors) 21. An IGBT 21 includes three electrodes: a collector electrode, an emitter electrode and a gate electrode. A diode 38 is electrically connected between the collector electrode and the emitter electrode of the IGBT 21. The diode 38 includes two electrodes; a cathode electrode and an anode electrode, with the cathode electrode electrically connected to the collector electrode of the IGBT 21 and the anode electrode electrically connected to the emitter electrode of the IGBT 21 so as to define the direction running from the emitter electrode toward the collector electrode at the IGBT 21 as a forward direction.

It is to be noted that MOSFETs (metal oxide semiconductor field effect transistors) may be used as the switching power semiconductor elements, instead. A MOSFET includes three electrodes: a drain electrode, a source electrode and a gate electrode. The MOSFET does not require a diode 38, such as those shown in FIG. 2, since it includes a parasitic diode with which the direction running from the drain electrode toward the source electrode is defined as the forward direction, present between the source electrode and the drain electrode.

The upper and lower arms in the serial circuit corresponding to a given phase are configured by electrically connecting the emitter electrode of one IGBT 21 and the collector electrode of another IGBT 21 in series. It is to be noted that while the figure shows the upper arm and the lower arm corresponding to a given phase each constituted with a single IGBT, a large current control capacity needs to be assured in the embodiment and thus, a plurality of IGBTs are connected in parallel to constitute an upper arm or a lower arm in the actual power module. However, for purposes of simplification, the following explanation is given by assuming that each arm is constituted with a single power semiconductor.

In the embodiment described in reference to FIG. 2, each upper arm or lower arm, corresponding to one of the three phases, is actually configured with three IGBTs. The collector electrode of an IGBT 21 constituting the upper arm in a given phase is electrically connected to the positive side of the battery 180, whereas the source electrode of an IGBT 21 constituting the lower arm in a given phase is electrically connected to the negative side of the battery 180. A middle point between the arms corresponding to each phase (an area where the emitter electrode of the upper arm-side IGBT and the collector electrode of the lower arm-side IGBT are connected) is electrically connected to the armature winding (stator winding) at the corresponding phase at the corresponding rotating electric machine 200 or 202.

The drive circuits 652 and 656, constituting drive units via which the corresponding inverter devices are controlled, each generate a drive signal used to drive the IGBTs 21 based upon a control signal output from the control circuit 648. The drive signals generated at the individual drive circuits 652 and 656 are respectively output to the gates of the various power semiconductor elements in the corresponding power modules 610 and 620. The drive circuits 652 and 656 are each configured as a block constituted with six integrated circuits that generate drive signals to be provided to the gates of the upper and lower arms corresponding to the various phases.

The control circuit 648, which controls the inverter devices, is constituted with a microcomputer that generates, through arithmetic operation, a control signal (a control value) based upon which the plurality of switching power semiconductor elements are engaged in operation (turned on/off). A torque command signal (a torque command value) provided from a higher-order control device, sensor outputs from the current sensors 660 and 662, and sensor outputs from rotation sensors mounted at the rotating electric machines 200 and 202 are input to the control circuit 648. Based upon these signals input thereto, the control circuit 648 calculates control values and outputs control signals to the drive circuits 652 and 656 to be used to control the switching timing.

The transmission/reception circuit 644 mounted at the connector substrate 642, which electrically connects the power conversion device 600 with an external control device, is engaged in information exchange with another device via the communication line 174 shown in FIG. 1. The capacitor module 630, constituting a smoothing circuit via which the extent of DC voltage fluctuation occurring as the IGBTs 21 are engaged in switching operation is reduced, is electrically connected in parallel with DC-side terminals of the first power module 610 and the second power module 620.

Figure 3:
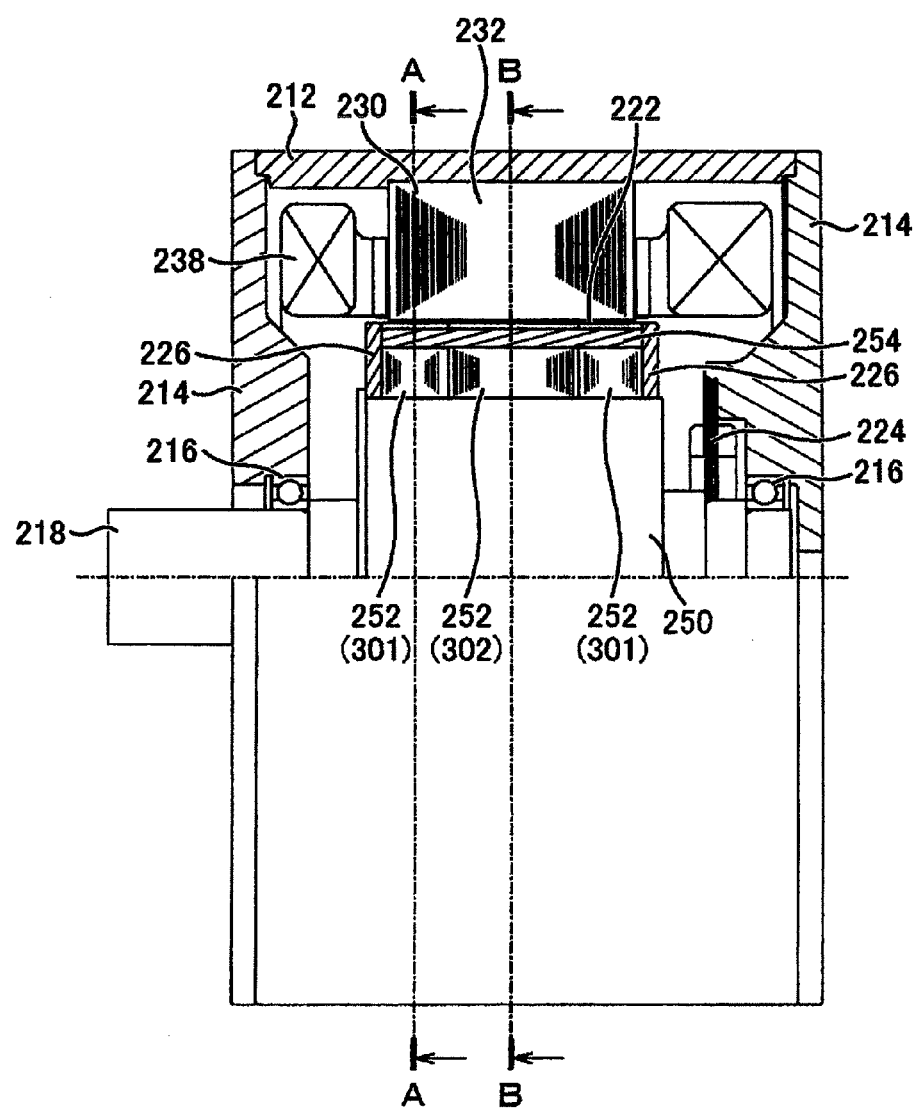
FIG. 3 A sectional view of the rotating electric machine 200

FIG. 3 shows the rotating electric machine 200 in FIG. 1 in a sectional view. It is to be noted that since the structure of the rotating electric machine 200 is substantially identical to that of the rotating electric machine 202, the following description focuses on the structure adopted in the rotating electric machine 200, taken as a representative example. However, the structural features described below do not need to be adopted in both rotating electric machines 200 and 202, as long as they are adopted in either one of them.

A stator 230, held inside a housing 212, includes a stator core 232 and a stator winding 238. On the inner circumferential side of the stator core 232, a rotor 250 is rotatably held over an air gap 222. The rotor 250 includes a rotor core 252 fixed onto a shaft 218, permanent magnets 254 and non-magnetic contact plates 226. The housing 212 includes a pair of end brackets 214 at each of which a bearing 216 is disposed. The shaft 218 is rotatably held via the bearings 216.

A resolver 224, which detects the positions of poles at the rotor 250 and the rotating speed of the rotor 250, is disposed at the shaft 218. An output from the resolver 224 is taken into the control circuit 648 shown in FIG. 2. The control circuit 248 outputs a control signal, generated based upon the output having been taken in, to the drive circuit 652. The drive circuit 652, in turn, outputs a drive signal, generated based upon the control signal, to the power module 610. At the power module 610, a switching operation is executed based upon the control signal so as to convert DC power, provided from the battery 180, to three-phase AC power. This three-phase AC power is provided to the stator winding 238 shown in FIG. 3 and, as a result, a rotating magnetic field is generated at the stator 230. The frequency of the three-phase AC current is controlled based upon an output value provided by the resolver 224 and the phases of the three-phase AC current relative to the rotor 250 are also controlled based upon the output value provided by the resolver 224.

Figure 4:
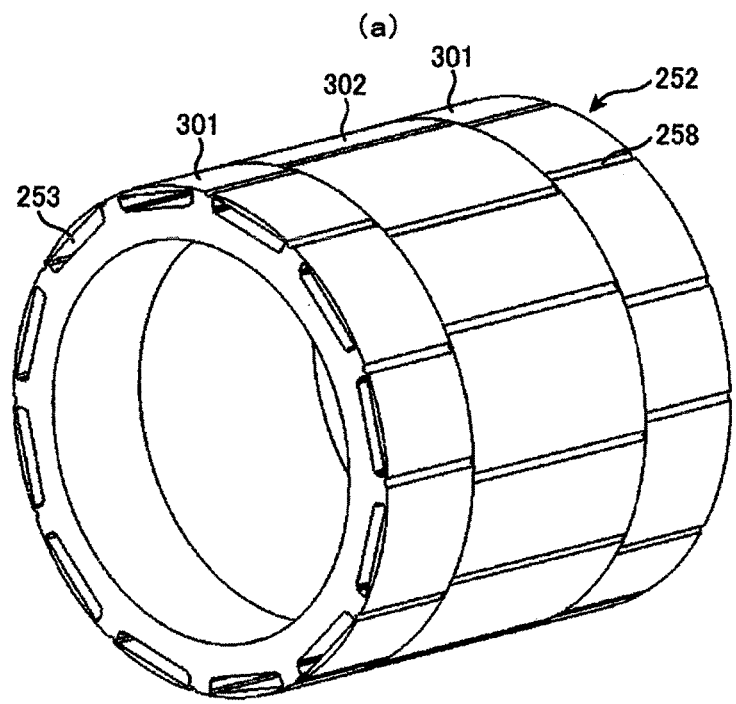
FIG. 4 Illustrations of the rotor core 252
Figure 4:
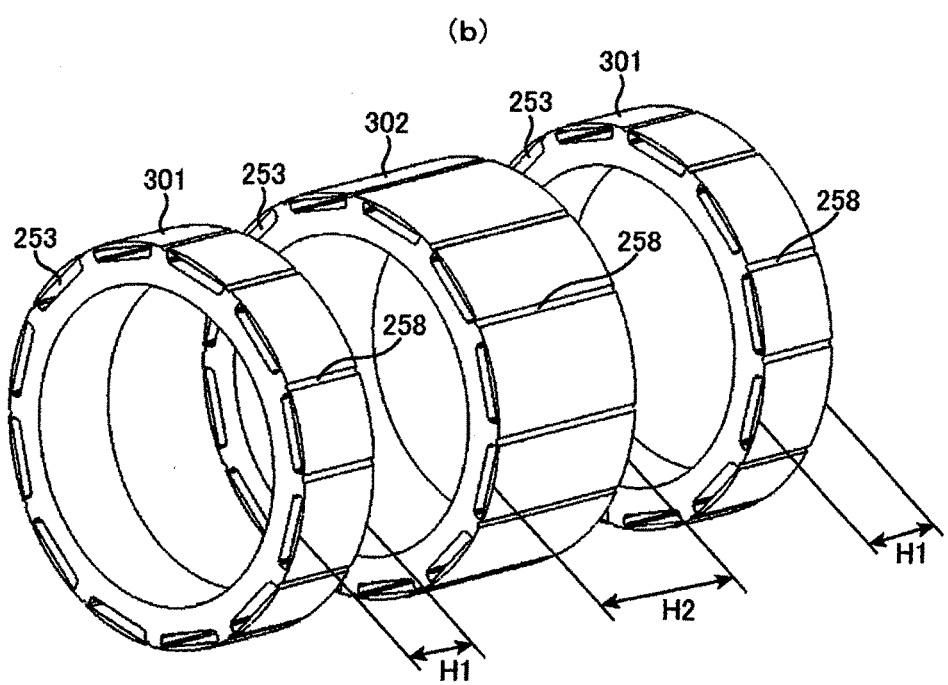

FIG. 4(a) shows the rotor core 252 of the rotor 250 in a perspective. The rotor core 252 is a three-stage structure constituted with two different types of cores 301 and 302, such as those shown in FIG. 4(b). The length H2 of the core 302, measured along the axial direction, is set substantially equal to the sum of the lengths H1 of the cores 301 along the axial direction.

Figure 5:
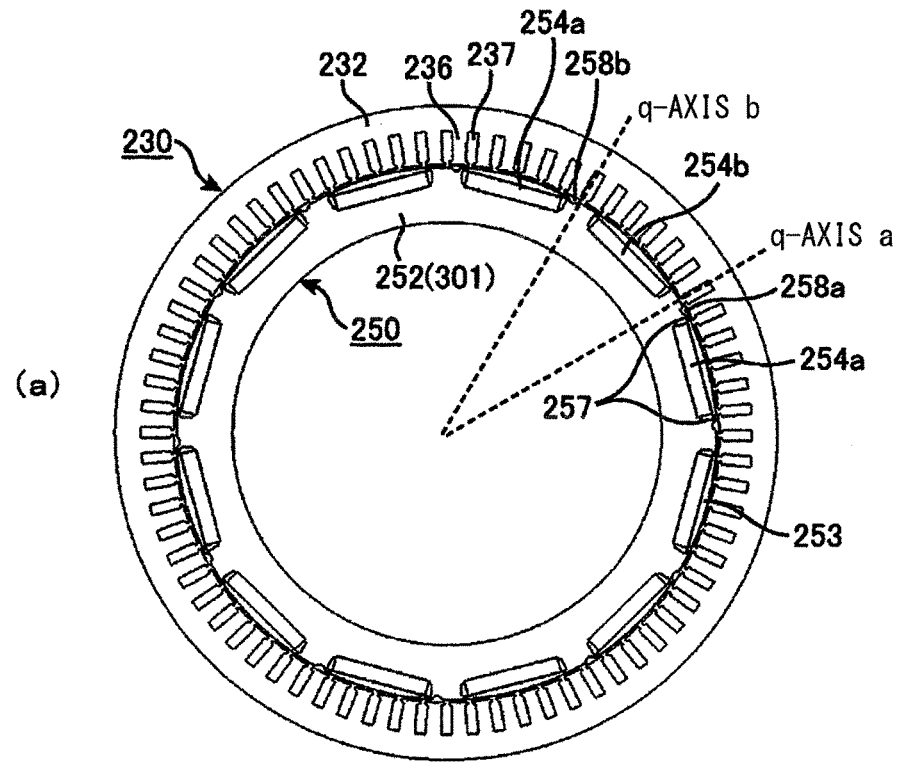
FIG. 5 Sectional views of the stator 230 and the rotor 250
Figure 5:
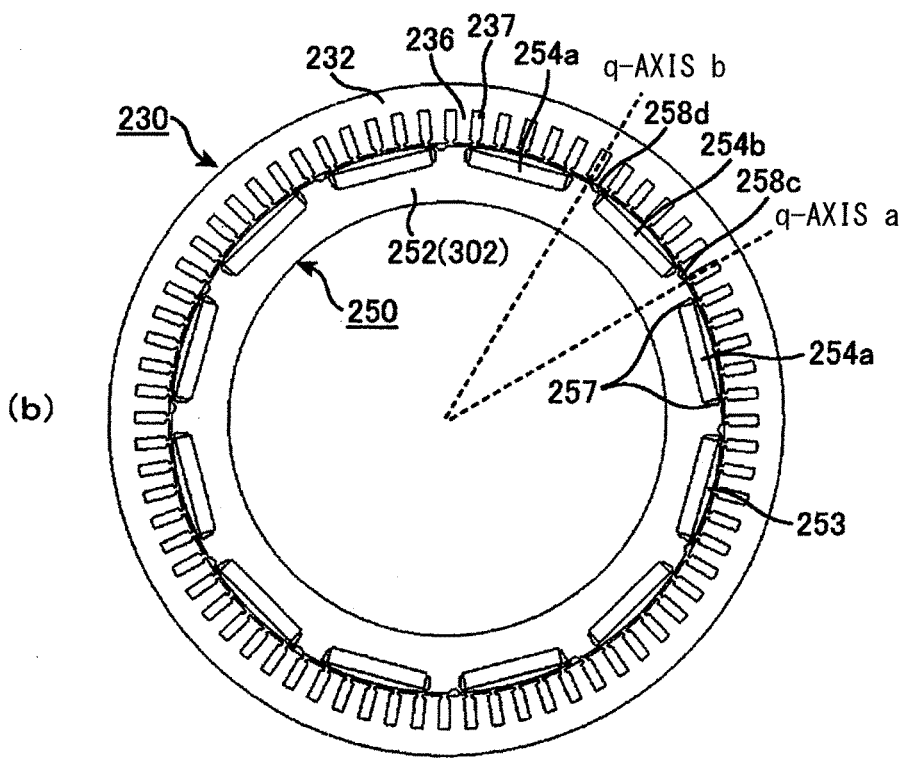

FIG. 5 shows sections of the stator 230 and the rotor 250, with FIG. 5(a) showing them in a sectional view taken along A-A passing through the core 301 (see FIG. 3) and FIG. 5(b) showing them in a sectional view taken along B-B passing through the core 302 (see FIG. 3). It is to be noted that FIG. 5 does not include an illustration of the housing 212, the shaft 218 and the stator winding 238. Numerous slots 237 and teeth 236 are formed in a uniform pattern along the entire inner circumference of the stator core 232. Reference numerals are appended to only one representative slot and an adjacent tooth in FIG. 5. Inside the slots 237, a slot insulator (not shown) is disposed and a plurality of phase windings corresponding to a U-phase, a V-phase and a W-phase, constituting the stator winding 238 in FIG. 3, are installed in the slots 237. Seventy two slots 237 are formed over equal intervals in the embodiment.

In addition, twelve holes 253, at which rectangular magnets are to be inserted, are formed near the outer circumference of the rotor core 252, over equal intervals along the circumferential direction. At each hole 253, with the depth thereof ranging along the axial direction, a permanent magnet 254 is embedded and fixed with an adhesive or the like. The holes 253 are formed so as to achieve a greater width, measured along the circumferential direction, compared to the width of the permanent magnets 254 (254a and 254b) measured along the circumferential direction and thus, hole spaces 257, present on the two sides of each permanent magnet 254, function as magnetic gaps. These hole spaces 257 may be filled with an adhesive or they may be sealed together with the permanent magnets 254 by using a forming resin. The permanent magnets 254 function as field poles of the rotor 250 and the rotor in this embodiment assumes a 12-pole structure.

The permanent magnets 254 are magnetized along the radial direction and the magnetizing direction is reversed from one field pole to the next. Namely, assuming that the surface of a permanent magnet 254a facing toward the stator and the surface of the permanent magnet 254a located on the axial side respectively achieve N polarity and S polarity, the stator-side surface and the axial-side surface of a permanent magnet 254b disposed next to the permanent magnet 254a respectively achieve S polarity and N polarity. Such permanent magnets 254a and 254b are disposed in an alternate pattern along the circumferential direction.

The permanent magnets 254 may be magnetized first and then embedded in the holes 253, or they may be inserted in the holes 253 at the rotor core 252 in an unmagnetized state and then magnetized by applying an intense magnetic field to the inserted permanent magnets. Once magnetized, the permanent magnets 254 exert a strong magnetic force. This means that if the permanent magnets 254 are magnetized before they are fixed at the rotor 250, the strong attracting force occurring between the permanent magnets 254 and the rotor core 252 is likely to present a hindrance during the permanent magnet installation process. Furthermore, the strong attracting force imparted by the permanent magnets 254 may cause foreign matter such as iron dust to settle on the permanent magnets 254. For these reasons, it is more desirable, from the viewpoint of maximizing productivity in manufacturing the rotating electric machine, to magnetize the permanent magnets 254 after they are inserted at the rotor core 252.

The permanent magnets 254 may be neodymium-based sintered magnets, samarium-based sintered magnets, ferrite magnets or neodymium-based bonded magnets. The residual magnetic flux density of the permanent magnets 254 is approximately 0.4 to 1.3 T.

As the rotating magnetic field is induced at the stator 230 by the three-phase AC currents (the three-phase AC currents flowing through the stator winding 238), torque is generated with the rotating magnetic field acting on the permanent magnets 254a and 254b at the rotor 250. This torque can be expressed as the product of the component in the magnetic flux imparted from the permanent magnets 254, which interlinks with a given phase winding, and the component in the AC current flowing through the phase windings, which is perpendicular to the interlinking magnetic flux. Since the AC currents are controlled so as to achieve a sine waveform, the product of the fundamental wave component in the interlinking magnetic flux and the fundamental wave component in the corresponding AC current represents the time-averaged torque component and the product of the higher harmonic component in the interlinking magnetic flux and the fundamental wave component in the AC current represents the torque ripple, i.e., the higher harmonic component of the torque. This means that the torque ripple can be decreased by reducing the higher harmonic component in the interlinking magnetic flux. In other words, since the product of the interlinking magnetic flux and the angular acceleration with which the rotor rotates represents the induced voltage, reducing the higher harmonic component in the interlinking magnetic flux is equivalent to reducing the higher harmonic component in the induced voltage.

Figure 6:
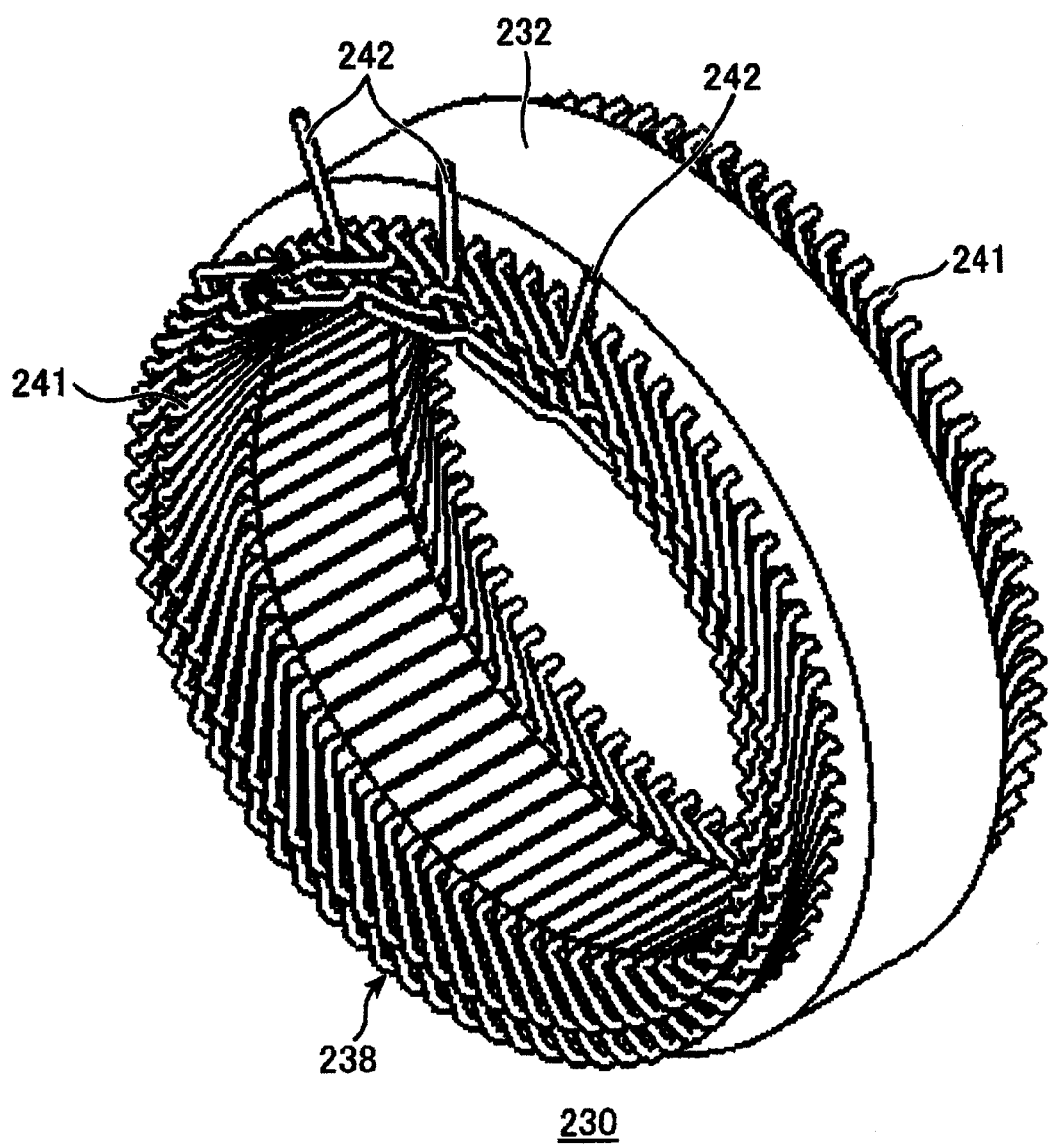
FIG. 6 A perspective view of the stator 230

FIG. 6 shows the stator 230 in a perspective. The stator winding 238 in the embodiment is wound around the stator core 232 by adopting a wave winding pattern. Coil ends 241 of the stator winding 238 are formed at the two end surfaces of the stator core 232. In addition, lead wires 242 of the stator winding 238 are led out on the side where one of the end surfaces of the stator core 232 is located. Three lead wires 242 are led out in correspondence to the U-phase, the V-phase and the W-phase.

Figure 7:
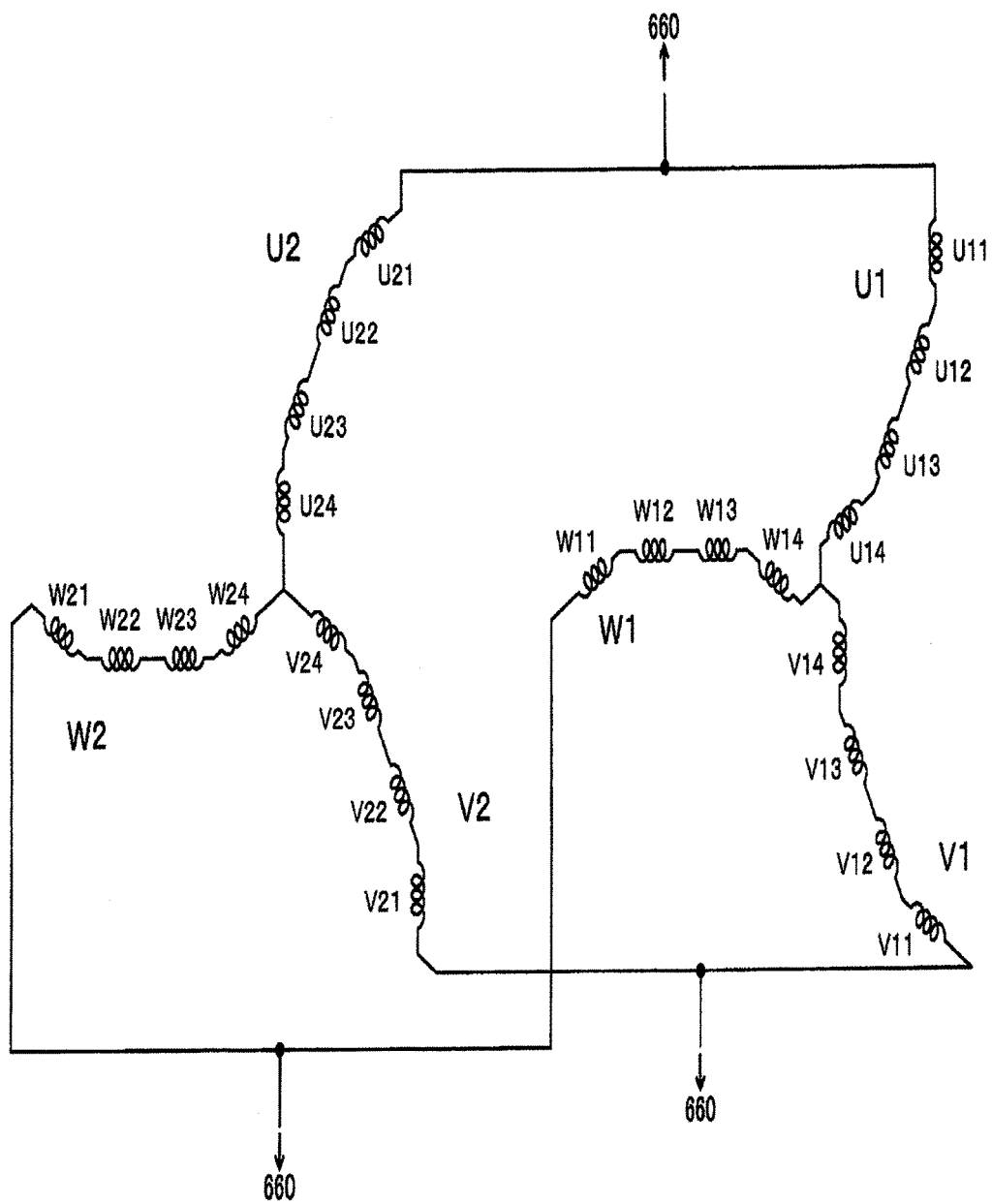
FIG. 7 A connection diagram pertaining to the stator winding 238

In the connection diagram in FIG. 7 pertaining to the stator winding 238, the connection method and the electrical phase relation among the phases of the individual phase windings are indicated. The stator winding 238 in the embodiment is achieved by adopting a double star connection, in which a first star connection, made up with a U1-phase winding group, a V1-phase winding group and a W1-phase winding group, is connected in parallel with a second star connection made up with a U2-phase winding group, a V2-phase winding group and a W2-phase winding group. The U1-phase winding group, the V1-phase winding group, the W1-phase winding group, the U2-phase winding group, the V2-phase winding group and the W2-phase winding group are each constituted with four coil windings. Namely, the U1-phase winding group includes coil windings U11 through U14, the V1-phase winding group includes coil windings V11 through V14, the W1-phase winding group includes coil windings W11 through W14, the U2-phase winding group includes coil windings U21 through U24, the V2-phase winding group includes coil windings V21 through V24 and the W2-phase winding group includes coil windings W21 through W24.

As shown in FIG. 7, structures substantially identical to that adopted in correspondence to the U phase are assumed for the V phase and the W phase, and the individual phase winding groups in each star connection are disposed so that the phase of the voltage induced at one phase winding group is offset by 120° in electrical angle relative to the phase of the voltage induced at the next phase winding group along a given direction. In addition, the angles formed by the coil windings in the individual phase winding groups represent relative phases. While the stator winding 238 in the embodiment is achieved by adopting the double star (2Y) connection with two star connections connected in parallel, as indicated in FIG. 7, the stator winding 238 may instead adopt a single star (1Y) connection with two star connections connected in series, depending upon the level of voltage required to drive the rotating electric machine.

Figure 8:
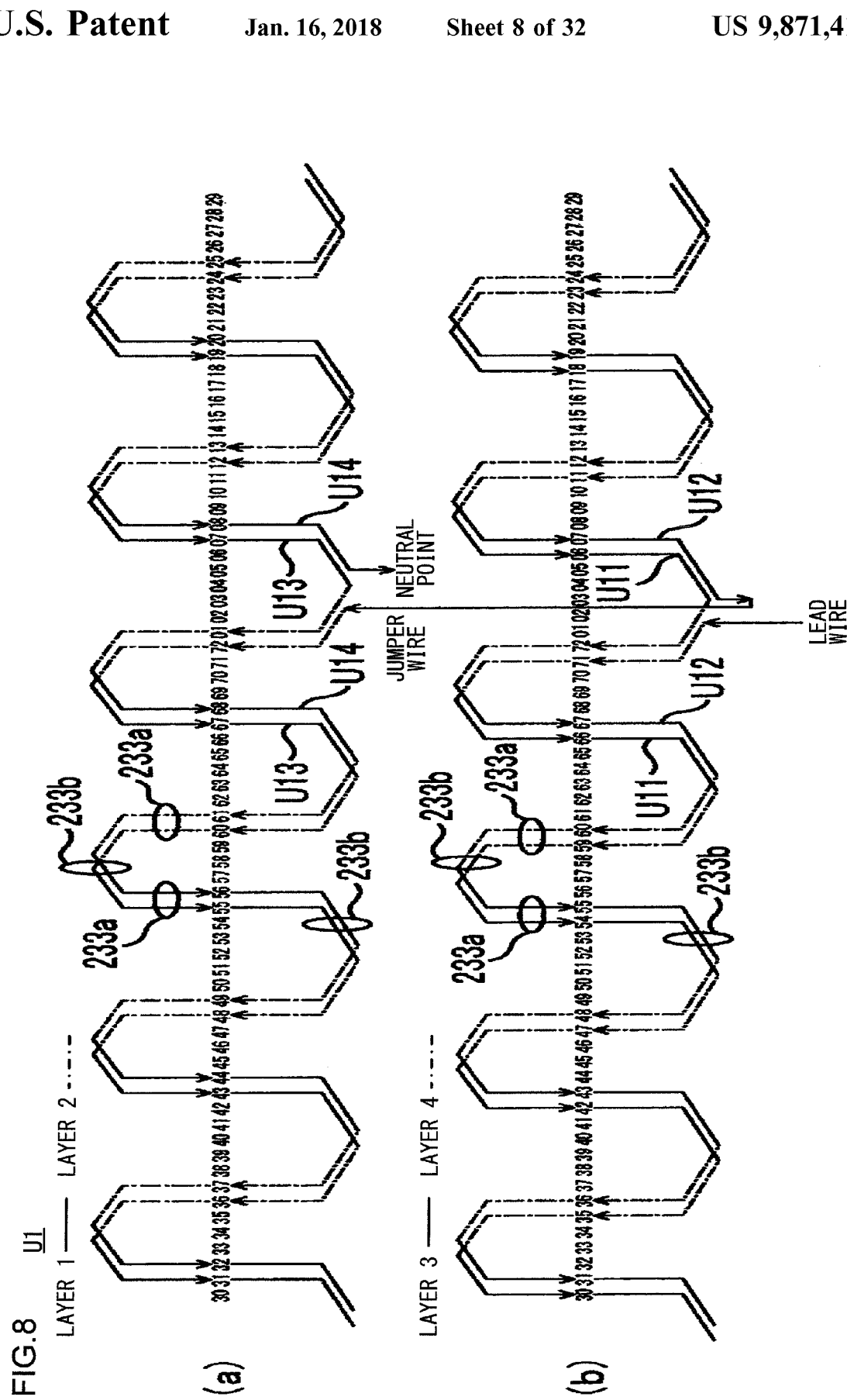
FIG. 8 A detailed connection diagram pertaining to the U-phase winding
Figure 8:
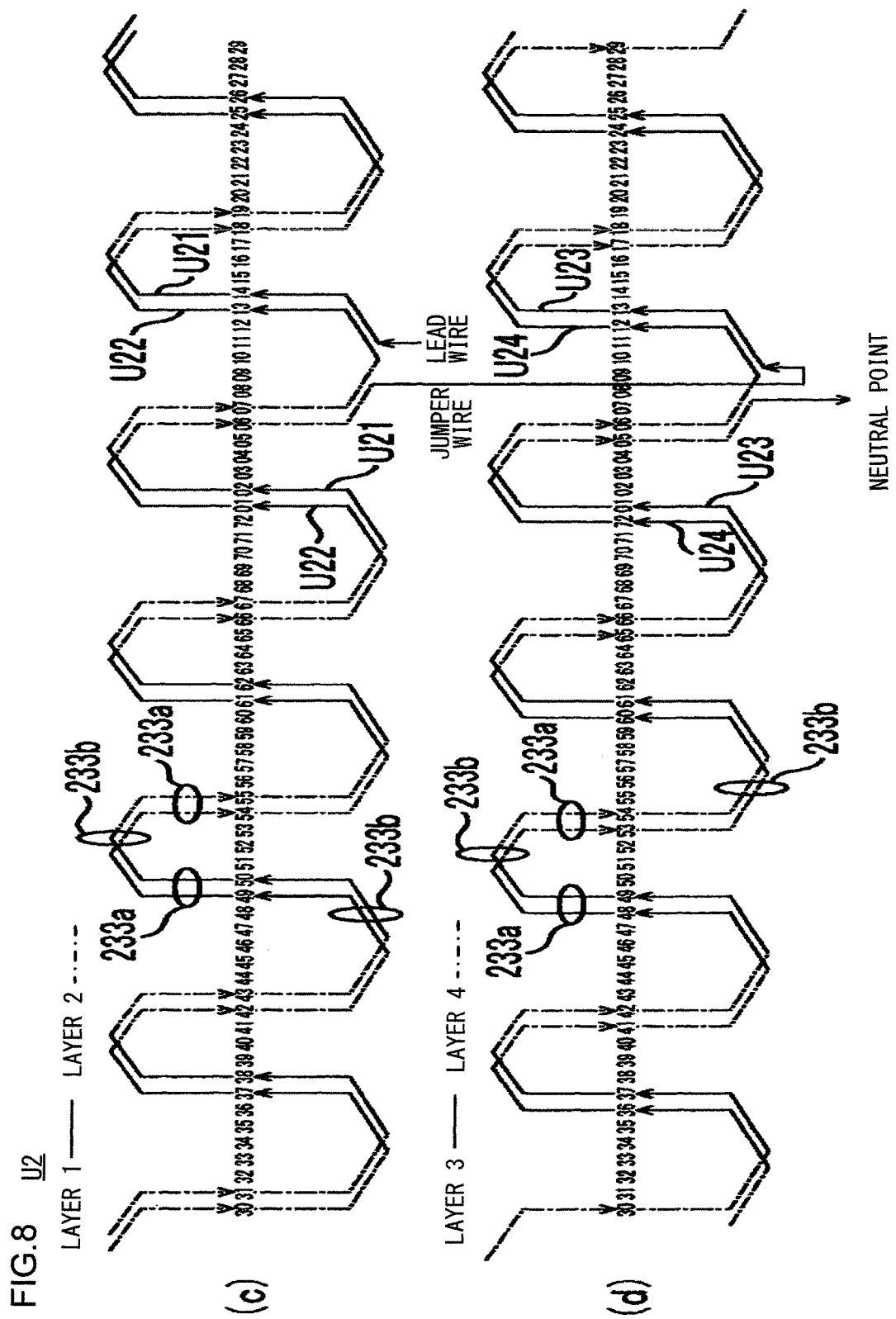

FIG. 8 provides a detailed connection diagram pertaining to the U-phase winding groups constituting part of the stator winding 238, with FIG. 8(a) showing the coil windings U13 and U14 in the U1-phase winding group, FIG. 8(b) showing the coil windings U11 and U12 in the U1-phase winding group, FIG. 8(c) showing the coil windings U21 and U22 in the U2-phase winding group and FIG. 8(d) showing the coil windings U23 and U24 in the U2-phase winding group. As explained earlier, seventy-two slots 237 are formed at the stator core 232 (see FIG. 5) and reference numerals 01, 02, ~71, 72 in FIG. 8 are slot numbers each assigned to a specific slot.

The coil windings U11 through U24 are each made up with slot conductors 233a inserted through slots and cross conductors 233b each connecting the ends of slot conductors 233a inserted through different slots, which are located on a specific side, so as to form a coil end 241 (see FIG. 6). For instance, the end of a slot conductor 233a inserted through the slot 237 assigned with slot No. 55 in FIG. 8(a), located on the upper side in the figure, is connected to the upper-side end of a slot conductor 233a inserted through the slot 237 assigned with slot No. 60 via a cross conductor 233b that forms an upper coil end, whereas the lower end of the slot conductor 233a inserted through the slot 237 assigned with slot No. 55 is connected to the lower end of the slot conductor 233a inserted through the slot 237 assigned with slot No. 48 via a cross conductor 233b that forms a lower coil end. A coil winding with a wave winding pattern is formed by connecting the slot conductors 233a via the cross conductors 233b as described above.

As will be explained in further detail later, four slot conductors 233a are inserted side-by-side, from the inner circumferential side through the outer circumferential side, within each slot in the embodiment. These four slot conductors will be referred to as a layer 1, a layer 2, a layer 3 and a layer 4, starting on the innermost side and moving toward the outer side. In FIG. 8, slot conductors in the coil windings U13, U14, U21 and U22, each forming the layer 1, are indicated by solid lines and slot conductors in the coil windings U13, U14, U21 and U22, each forming the layer 2, are indicated by the one-point chain lines. Slot conductors in the coil windings U11, U12, U23 and U24, each forming the layer 3, are indicated by solid lines and slot conductors in the coil windings U11, U12, U23 and U24, each forming the layer 4, are indicated by the one-point chain lines.

It is to be noted that the coil windings U11 through U24 may each be formed by using a continuous single-piece conductor or they may each be formed by first inserting segment coils through the slots and then connecting the segment coils through welding or the like. The use of the segment coils is advantageous in that coil ends 241 located at the two ends facing opposite each other along the axial direction, further beyond the ends of the stator core 232, can be formed in advance before inserting the segment coils through the slots 237, which makes it possible to easily create an optimal insulation distance between different phases or within a given phase. Such an optimal insulation distance is bound to assure effective insulation through deterrence of partial discharge attributable to a surge voltage caused as the IGBTs 21 are engaged in switching operation.

In addition, while the conducting material used to form the coil windings may be a flat wire or a round wire or may be a conducting material made up with numerous thin wires bundled together, the coil winding is ideally formed by using a flat wire so as to maximize the space factor to ultimately achieve a compact rotating electric machine assuring higher output and achieve higher efficiency.

Figure 9:
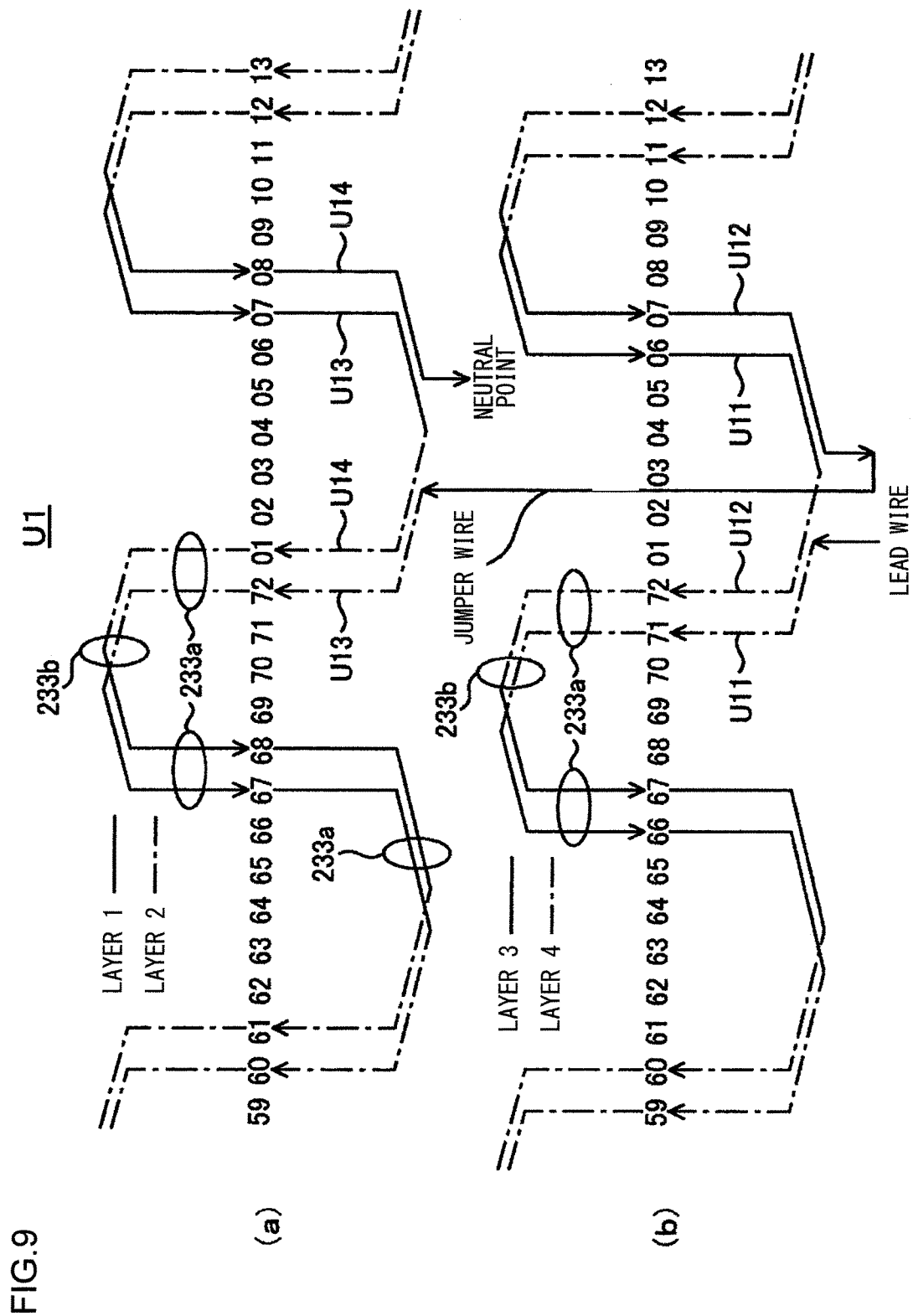
FIG. 9 A part of the U1-phase winding group in an enlargement
Figure 10:
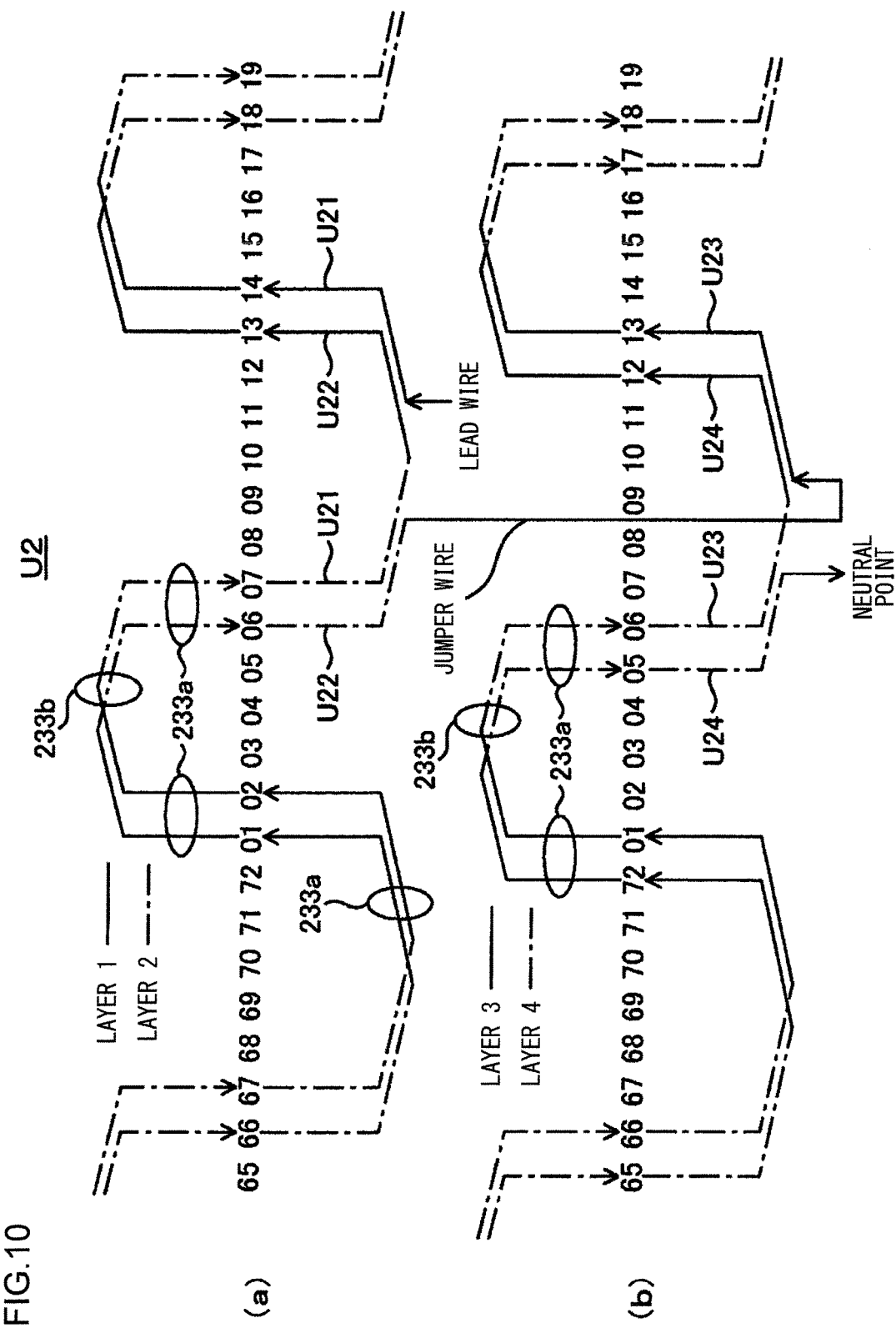
FIG. 10 A part of the U2-phase winding group in an enlargement

FIGS. 9 and 10 respectively provide enlarged views of parts of the U1-phase winding group and the U2-phase winding group shown in FIG. 8. FIGS. 9 and 10 each provide a view of a part of the U1-phase winding group or the U2-phase winding group accounting for approximately four poles, which includes the area where a jumper wire is present. As shown in FIG. 9(b), the stator winding group U1, starting at the lead wire, enters the slot assigned with slot No. 71 as a layer-4 slot conductor, and then extends as a cross conductor 233b astride a range equivalent to five slots before entering the slot assigned with slot No. 66 as a layer-3 slot conductor 233a. Then, it leaves the layer-3 position in the slot assigned with slot No. 66, runs astride a range equivalent to seven slots and leads into the slot assigned with slot No. 59 as a layer-4 slot conductor.

In other words, the stator winding is wound by assuming a wave winding pattern until it encircles the stator core 232 by a full turn as it takes the layer-3 position in the slot assigned with slot No. 06 with its cross conductors 233b located on the coil end side (the lower side in the figure) where the lead wire is led out, each running astride slots with the slot pitch Np set to 7 and its cross conductors 233b, located on the opposite coil end side each running astride slots with the slot pitch Np set to 5. This portion of the stator winding encircles the stator core by substantially a full turn and forms the coil winding U11 shown in FIG. 7.

Next, the stator winding, having left the layer-3 position in the slot assigned with slot No. 06, runs astride a range equivalent to six slots and then leads into the slot assigned with slot No. 72 as a layer-4 slot conductor. The portion of the stator winding at the layer-4 position in the slot assigned with slot No. 72 and beyond constitutes the coil winding U12 shown in FIG. 7. As is the coil winding U11, the coil winding U12 is formed by wave-winding the stator winding so as to encircle the stator core 232 by a full turn until it takes the layer-3 position in the slot assigned with slot No. 06, with the cross conductors 233b located on the side where the lead wire is present, each running astride slots with the slot pitch Np set to 7 and the cross conductors 233b located on the opposite side each running astride slots with the slot pitch Np set to 5. This portion of the stator winding encircles the stator core by substantially a full turn and forms the coil winding U12.

It is to be noted that since the coil winding U12 is wound around the stator core with an offset relative to the coil winding U11, which is equivalent to a one-slot pitch, a phase difference in electrical angle equivalent to the one-slot pitch, manifests. The one-slot pitch is equivalent to 30° in electrical angle in the embodiment, and accordingly, FIG. 7 clearly shows that the coil winding U11 and the coil winding U12 are offset relative to each other by 30°.

The stator winding, having left the layer-3 position in the slot assigned with slot No. 07, leads into the slot assigned with slot No. 72 as a layer-2 slot conductor (see FIG. 9(a)) via the jumper wire running astride a range equivalent to seven slots. Subsequently, the stator winding is wound around the stator core 232 so as to encircle the stator core 232 by a full turn, from the layer-2 position in the slot assigned with slot No. 72 through the layer-1 position in the slot assigned with slot No. 07, with the cross conductors 233b located on the side where the lead wire is present each running astride slots with the slot pitch Np set to 7 and the cross conductors 233b, located on the opposite side, each running astride slots with the slot pitch Np set to 5, in much the same way as that with which the coil windings U11 and U12 are formed. This portion of the stator winding encircles the stator core by substantially a full turn and forms the coil winding U13 shown in FIG. 7.

It is to be noted that, as FIG. 9 clearly indicates, the coil winding U13 is wound without an offset relative to the coil winding U12 along the circumferential direction. This means that there is no phase difference between the coil winding U12 and the coil winding U13. Accordingly, FIG. 7 shows the coil windings U12 and U13 without any phase difference manifesting between them.

Lastly, the stator winding, having left the layer-1 position in the slot assigned with slot No. 07, runs astride a range equivalent to six slots and then leads into the slot assigned with slot No. 01 as a layer-2 slot conductor. Subsequently, the stator winding is wound around the stator core 232 so as to encircle the stator core 232 by a full turn, from the layer-2 position in the slot assigned with slot No. 01 through the layer-1 position in the slot assigned with slot No. 08, with the cross conductors 233b, located on the side where the lead wire is present, each running astride slots with the slot pitch Np set to 7 and the cross conductors 233b, located on the opposite side, each running astride slots with the slot pitch Np set to 5, in much the same way as that with which the coil windings U11, U12 and U13 are formed. This portion of the stator winding encircles the stator core by substantially a full turn and forms the coil winding U14 shown in FIG. 7.

It is to be noted that since the coil winding U14 is wound around the stator core with an offset relative to the coil winding U13 by a one-slot pitch, a phase difference in electrical angle equivalent to the one-slot pitch manifests. Accordingly, FIG. 7 clearly shows that the coil winding U13 and the coil winding U14 are offset by 30°.

The coil windings in the stator winding group U2 shown in FIG. 10, too, are wound with a wave winding pattern with the cross conductors running astride slots with the slot pitches set as in the stator winding group U1. The coil winding U21 is wound around so as to encircle the stator core from the layer-1 position in the slot assigned with slot No. 14 through the layer-2 position in the slot assigned with slot No. 07, whereas the coil winding U22 is wound around so as to encircle the stator core from the layer-1 position in the slot assigned with slot No. 13 through the layer-2 position in the slot assigned with slot No. 06. Subsequently, the stator winding, having left the layer-2 position in the slot assigned with slot No. 06 leads into the slot assigned with slot No. 13 as a layer-3 slot conductor via the jumper wire and is wound around as the coil winding U23 until it enters the slot assigned with slot No. 06 as a layer-4 slot conductor. Subsequently, the stator winding is wound so as to encircle the stator core from the layer-3 position in the slot assigned with slot No. 12 through the layer-4 position in the slot assigned with slot No. 05, thereby forming the coil winding U24.

As described above, the stator winding group U1 is made up with the coil windings U11, U12, U13 and U14, and a voltage representing the sum of the voltages generated at the various phases assumed for the individual coil windings combined together is induced at the stator winding group U1. Likewise, the voltage representing the sum of the voltages generated at the various phases assumed for the coil windings U21, U22, U23 and U24 combined together is induced at the stator winding group U2. While the stator winding group U1 and the stator winding group U2 are connected in parallel as shown in FIG. 7, there is no phase difference between the voltage induced at the stator winding group U1 and the voltage induced at the stator winding group U2 and, for this reason, imbalanced conditions, which may manifest as, for instance, a circulating current, do not occur even though the stator winding groups U1 and U2 are connected in parallel.

In addition, the cross conductors 233b are each made to run astride slots with the slot pitch Np set to (number of slots per pole +1) on one coil end side and are each made to run astride slots with the slot pitch Np set to (number of slots per pole −1) on the other coil end side. Furthermore, the coil windings are wound by ensuring that there is no phase difference between the coil winding U12 and the coil winding U13 and that there is no phase difference between the coil winding U22 and the coil winding U23. Through these measures, a positional arrangement such as that shown in FIG. 11 is achieved for the slot conductors 233a.

Figure 11:
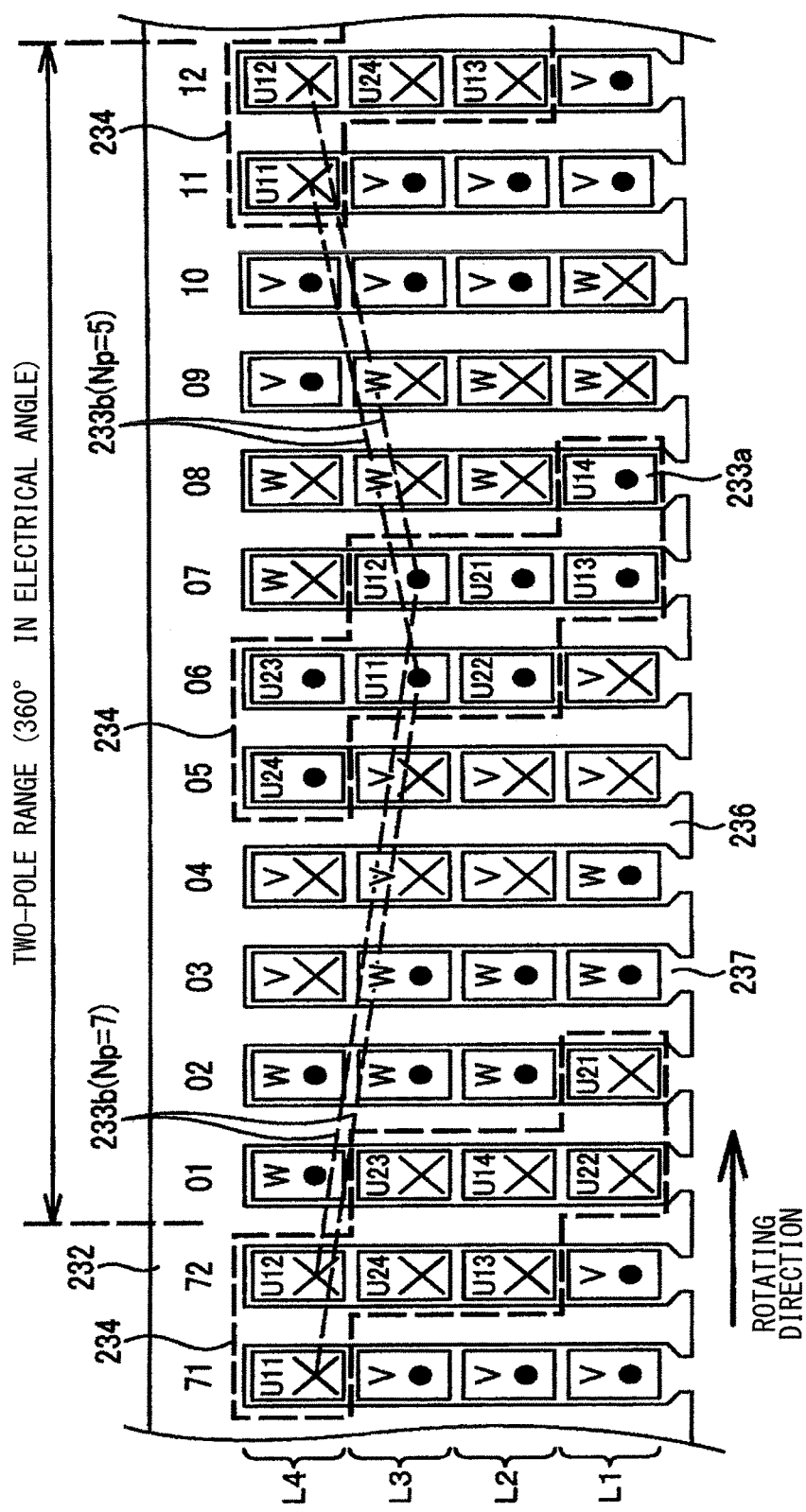
FIG. 11 A diagram indicating the positional arrangement with which the slot conductors 233a are disposed FIG. 12 Diagrams indicating the positional arrangement among the slot conductors 233a FIG. 13 Partial sectional views of the stator 230 and the rotor 250 in enlargements FIG. 14 An illustration of reluctance torque FIG. 15 Illustrations indicating a magnetic flux distribution that may manifest in non-applying current state FIG. 16 A diagram illustrating how the cogging torque may be reduced FIG. 17 A graph indicating the relationship between the ratio τm/τp representing the degree of arc at the magnet poles and the cogging torque FIG. 18 A diagram indicating waveforms of the cogging torque FIG. 19 A diagram indicating waveforms of the induced voltage FIG. 20 A diagram providing results obtained by analyzing the higher harmonic component in the induced voltage waveforms FIG. 21 A diagram indicating waveforms of the torque induced by supplying an AC current FIG. 22 A diagram providing results obtained by analyzing the higher harmonic component in the torque waveforms FIG. 23 An illustration of the toroidal 0th-order vibration mode at the stator FIG. 24 An illustration of the toroidal 6th-order vibration mode at the stator FIG. 25 An illustration of the vibration mode taking on the toroidal 6th-order component at the stator, in which the phase is reverse at the two ends facing opposite each other along the axial direction FIG. 26 A detailed connection diagram pertaining to the U-phase winding achieved in a second embodiment FIG. 27 A diagram indicating the positional arrangement with which the slot conductors 233a are disposed in the second embodiment FIG. 28 A detailed connection diagram pertaining to a part of the U-phase winding achieved in a third embodiment FIG. 29 A diagram indicating the positional arrangement with which the slot conductors 233a are disposed in the third embodiment

FIG. 11 shows the positional arrangement with which the slot conductors 233a are disposed at the stator core 232 in a view illustrating the part of the stator core 232 ranging from the slot No. 71 through slot No. 12 in FIG. 8 through FIG. 10. It is to be noted that the rotor rotates along the direction running from the left side of the figure toward the right side of the figure. In the embodiment, twelve slots 237 are formed in correspondence to two poles, i.e., over the 360° range in electrical angle. This means that the range from slot No. 01 through slot No. 12 in FIG. 11, for instance, corresponds to two poles. Thus, the number of slots per pole is six, whereas the number of slots per pole per phase NSPP is 2 (=6/3). Four slot conductors 233a in the stator winding 238 are inserted at each slot 237.

Inside each rectangle representing a slot conductor 233a, a specific code among codes U11 through U24, V and W indicating the U-phase, the V-phase and the W-phase, and a filled circle mark "●" indicating the direction running from the lead wire toward the neutral point or a cross mark "x" indicating the direction opposite to the direction indicated by "●" are shown. In addition, a slot conductor 233a present on the innermost circumferential side of a given slot 237 (toward the bottom of the slot) will be referred to as a layer-1 slot conductor, and the subsequent slot conductors 233a in the slot 237 will be referred to as a layer-2 slot conductor, which is set next to the innermost slot conductor 233a, a layer-3 slot conductor and a layer-4 slot conductor, which is located on the outermost circumferential side (closest to the slot opening). In addition, reference numerals 01 through 12 are slot numbers similar to those shown in FIG. 8 through FIG. 10. It is to be noted that the U-phase slot conductors 233a alone are appended with the codes U11 through U24 indicating the corresponding coil windings, whereas the V-phase slot conductors 233a and the W-phase slot conductors 233a are appended with the codes V and W, simply indicating the corresponding phases.

The eight slot conductors 233a inside each dotted-line enclosure 234 in FIG. 11 are all U-phase slot conductors 233a. For instance, the slot conductor group 234 inside the central enclosure includes slot conductors 233a in the coil windings U24 and U23 assuming the layer-4 positions in the slots assigned with slot Nos. 05 and 06 respectively, slot conductors 233a in the coil windings U11 and U12 assuming the layer-3 positions in the slots assigned with the slot Nos. 06 and 07 respectively, slot conductors 233a in the coil windings U22 and U21 assuming layer-2 positions in the slots assigned with the slot Nos. 06 and 07 respectively and slot conductors 233a in the coil windings U13 and U14 assuming the layer-1 positions in the slots assigned with the slot Nos. 07 and 08 respectively.

When the number of slots per pole is six, the number of slots per pole per phase is two and the number of slot conductors 233 inserted in layers in each slot 237 is four, the U-phase slot conductors 233a (and the V-phase slot conductors 233a and the W-phase slot conductors 233a) are often disposed by adopting a positional arrangement such as that shown in FIG. 12(a). In this positional arrangement, the slot conductor group on the right-hand side in the figure and the slot conductor group on the left-hand side in the figure are set apart from each other with a six-slot pitch.

The positional arrangement shown in FIG. 12(b), which is adopted in the embodiment, is distinguishable from the standard arrangement in that the pair of slot conductors 233a in layer 1 (L1) in each slot conductor group is offset by a one-slot pitch along the direction in which the rotor rotates (toward the right side in the figure) and that the pair of slot conductors 233a in layer 4 (L4) in the slot conductor group is offset by one-slot pitch along the direction opposite from the rotating direction (toward the left side in the figure). As a result, the cross conductor 233b connecting the slot conductor 233a in the coil winding U11 taking up the layer-4 position and the slot conductor 233a in the coil winding U11 taking up the layer-3 (L3) position runs astride slots with a seven-slot pitch, whereas the cross conductor 233b connecting the slot conductor 233a in the coil winding U24 taking up the layer-4 position and the slot conductor 233a in the coil winding U24 taking up the layer-3 (L3) position runs astride slots with a 5-slot pitch. It is to be noted that the direction opposite from the direction along which the rotor rotates will be referred to as a reverse rotating direction in the following description.

In this positional arrangement, the corresponding slot conductors 233a in slot conductor groups corresponding to the V-phase and the W-phase, as well as the slot conductors 233a corresponding to the U-phase, are disposed with a one-slot pitch offset and, as a result, slot conductor groups 234 achieving identical shapes are formed in correspondence to the U-phase, the V-phase and the W-phase, as shown in FIG. 11. Namely, along the direction in which the rotor rotates, a slot conductor group made up with slot conductors 233a corresponding to the U-phase and each appended with the filled circle mark, a slot conductor group made up with slot conductors 233a corresponding to the W-phase and each appended with the cross mark, a slot conductor group made up with slot conductors 233a corresponding to the V-phase and each appended with the filled circle mark, a slot conductor group made up with slot conductors 233a corresponding to the U-phase and each appended with the cross mark, a slot conductor group made up with slot conductors 233a corresponding to the W-phase and each appended with the filled circle mark, and a slot conductor group made up with slot conductors 233a corresponding to the V-phase and each appended with the cross mark are formed in this order.

As shown in FIG. 11, the positional arrangement achieved in the embodiment is characterized in that:

(a) the cross conductors 233b connect slot conductors 233a by each running astride slots with the slot pitch Np set to N+1 (=7) on one coil end side and each running astride slots with the slot pitch Np set to N−1 (=5) on the other coil end side with N (=6) representing the number of slots per pole;

(b) the stator winding includes slot conductor groups 234 each made up with a set of slot conductors 223a corresponding to a single phase, which are inserted through a predetermined number Ns (=4) of successive slots forming a continuous range along the circumference of the stator core so as to take up successive slot positions and layer positions; and (c) the predetermined number of slots Ns is set so that Ns=NSPP+NL=4 with NSPP (=2) representing the number of slots per pole per phase, when the number of layers is 2×NL (NL=2).

It is to be noted that when slot conductors 223b are set to take up successive slot positions and successive layer positions, the slot conductors taking up matching layer positions are inserted at successive slots 237 and the slot conductors inserted through a single slot 237 take up successive layer positions, as shown in FIG. 11. In the description of the embodiment, a set of slot conductors 233a disposed by adopting this positional arrangement will be referred to as a slot conductor group 234.

FIG. 13(a) is a partial enlargement of the sectional view presented in FIG. 5(a). At the cores 301 constituting part of the rotor core 252, grooves, which form magnetic gaps 258 at the surface of the rotor 250, are present in addition to the gaps 257 formed on the two sides of each permanent magnet 254. The gaps 257 are formed for purposes of cogging torque reduction, whereas the magnetic gaps 258 are formed in order to reduce the extent of torque pulsation occurring during applying current. In the following description, the central axis running between a given permanent magnet 254a and the permanent magnet directly to the left of the permanent magnet 254a, viewed from the inner circumferential side of the rotor 250, will be referred to as a q-axis a and the central axis running between a permanent magnet 254b and the magnet directly to the left of the permanent magnets 254b, viewed from the inner circumferential side of the rotor 250, will be referred to as a q-axis b. A magnetic gap 258a occupies a position offset to the right relative to the q-axis a, whereas a magnetic gap 258b occupies a position offset to the left relative to the q-axis b. In addition, the magnetic gap 258a and the magnetic gap 258b are set so as to achieve symmetry relative to a d-axis, i.e., the central axis of the magnetic pole.

FIG. 13(b) is a partial enlargement of the sectional view presented in FIG. 5(b). At the core 302, constituting part of the rotor core 252, magnetic gaps 258c and 258d, instead of the magnetic gaps 258a and 258b, are formed. Viewed from the inner circumferential side of the rotor 250, the magnetic gap 258c occupies a position offset to the left relative to the q-axis a, and the magnetic gap 258d occupies a position offset to the right relative to the q-axis b. As FIG. 5 clearly indicates, the sections of the cores 301 and the core 302 are identical in appearance except for the different positions of the magnetic gaps 258a and 258b and the magnetic gaps 258c and 258d.

The positions of the magnetic gap 258d and the magnetic gap 258c are offset by 180° in electrical angle relative to the positions of the magnetic gap 258a and the magnetic gap 258b respectively. In other words, the core 302 can be formed by rotating a core 301 by an extent equivalent to a single magnetic pole pitch. Since this means that the cores 301 and the core 302 can be manufactured by using a single die, the manufacturing cost can be lowered. In addition, the holes 253 at the cores 301 and 302 occupy matching positions without any offset along the circumferential direction. As a result, the permanent magnets 254 installed in the individual holes 253 are each a single-piece permanent magnet passing through the cores 301 and 302, not a magnet constituted with separate parts split along the axial direction. However, it will be obvious that a permanent magnet 254, constituted with a plurality of split segments, may be installed by stacking the segments one on top of another along the axis of a hole 253.

A rotating magnetic field induced by the three-phase AC currents at the stator 230 acts on the permanent magnets 254a and 254b at the rotor 250, thereby generating a magnetic torque. In addition to the magnetic torque, a reluctance torque is in action at the rotor 250.

Figure 14:
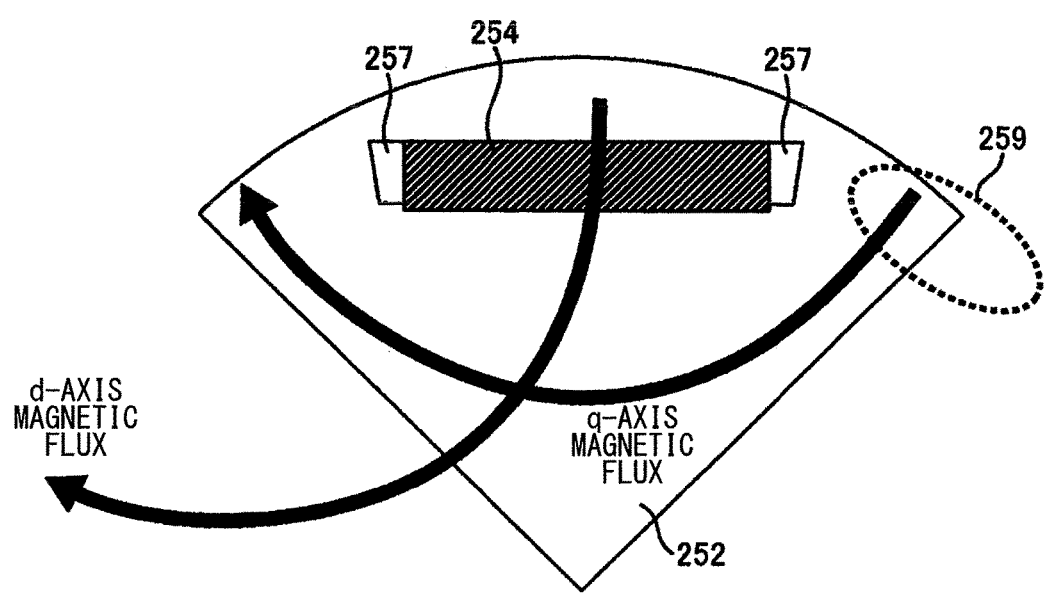

FIG. 14 illustrates the reluctance torque. The axis of a magnetic flux passing through the center of a magnet is normally referred to as a d-axis, whereas the axis of a magnetic flux passing from one side of the position between poles, toward the other side of the position between poles, is normally referred to as a q-axis. The area of the core located over the middle point between the poles formed at magnets will be referred to as an auxiliary salient pole portion 259. Since the magnetic permeability of the permanent magnets 254 installed in the rotor 250 is substantially equal to that of air, the area along the d-axis is magnetically recessed and the area along the q-axis magnetically projects, viewed from the side where the stator is located. For this reason, the core area over the q-axis is referred to as a salient pole. The reluctance torque occurs due to the difference between the ease with which the magnetic flux passes along the d-axis and the ease with which the magnetic flux passes along the q-axis, i.e., due to the salient pole ratio.

As the description above indicates, a rotating electric machine adopting the present invention is a type of rotating electric machine that uses both the magnetic torque and the auxiliary salient pole reluctance torque. Torque pulsation occurs due to both the magnetic torque and the reluctance torque. The torque pulsation includes a pulsation component manifesting during not applying current and a pulsation component manifesting during applying current. Of those, the pulsation component manifesting during not applying current is normally referred to as cogging torque. When the rotating electric machine is actually used in operation under load, torque pulsation occurs as a combination of the cogging torque and the pulsation component manifesting during applying current.

Most methods proposed in the related art for reducing torque pulsation occurring in rotating electric machines only refer to reduction of the cogging torque, and the issue of torque pulsation occurring applying current is often not addressed in those methods. However, noise in a rotating electric machine more often occurs under load rather than in a no-load state. In other words, it is critical to reduce torque pulsation occurring under load in order to effectively reduce noise in a rotating electric machine and full noise reduction cannot be achieved simply by reducing the cogging torque alone.

The torque pulsation reducing method achieved in the embodiment will be described next.

First, the no-load characteristics to manifest in the non-applying current state will be described. FIG. 15(a) presents the results obtained by simulating the distribution of magnetic fluxes occurring when no electric current is supplied to the stator winding 238, i.e., the distribution of magnetic fluxes attributable to the permanent magnets 254, in an illustration of two poles, one represented by an area 401 formed with a permanent magnet 254a and the other represented by an area 402 formed with a permanent magnet 254b. Namely, the figure presents the results of a simulation of a rotating electric machine that includes the area 401 and the area 402 formed with an alternating pattern along the circumferential direction in a view taken of the A-A section. Since the rotating electric machine achieved in the embodiment has twelve poles, six poles of area 401 and six poles of area 402 are set in an alternating pattern along the circumferential direction. An examination of the individual poles reveals that the magnetic gaps 258a and 258b are present at the auxiliary salient pole portions 259 in the area 401, whereas no magnetic gaps 258 are present at the auxiliary salient portions 259 in the area 402.

In the non-applying current state, the magnetic fluxes at each permanent magnet 254 short the magnet end areas. For this reason, no magnetic flux passes along the q-axis at all. In addition, hardly any magnetic flux passes through areas corresponding to the magnetic gaps 258a and 258b formed at positions slightly offset relative to the gaps 257 present at the magnet ends. Magnetic fluxes that pass through the stator core 232 reach the teeth 236 by way of the core areas located on the stator side of the permanent magnets 254. Thus, the presence of the magnetic gaps 258a and 258b hardly affects the magnetic fluxes in the non-applying current state, which is pertinent to the cogging torque. In other words, the characteristics such as the cogging torque, induced voltage and the like in the no-load state are shown to be unaffected by the magnetic gaps 258a and 258b.

FIG. 15(b) presents the results of simulation corresponding to an area 401 alone, whereas FIG. 15(c) presents the results of simulation corresponding to an area 402 alone. The area 401 in FIG. 15(b) is part of a rotary electric machine with twelve poles, having areas 401 only, set along the circumferential direction so that the direction of magnetization at a given permanent magnet 254 forming a specific pole is reversed at the next permanent magnet 254 forming another pole. The area 402 in FIG. 15(c) is included in a rotary electric machine with twelve poles, having areas 402 only, set along the circumferential direction so that the direction of magnetization at a given permanent magnet 254 forming a specific pole is reversed at the next permanent magnet 254 forming another pole. The magnetic flux distributions in FIG. 15(b) and FIG. 15(c) are both similar to that shown in FIG. 15(a), with no magnetic flux passing along the q-axis.

Figure 16:
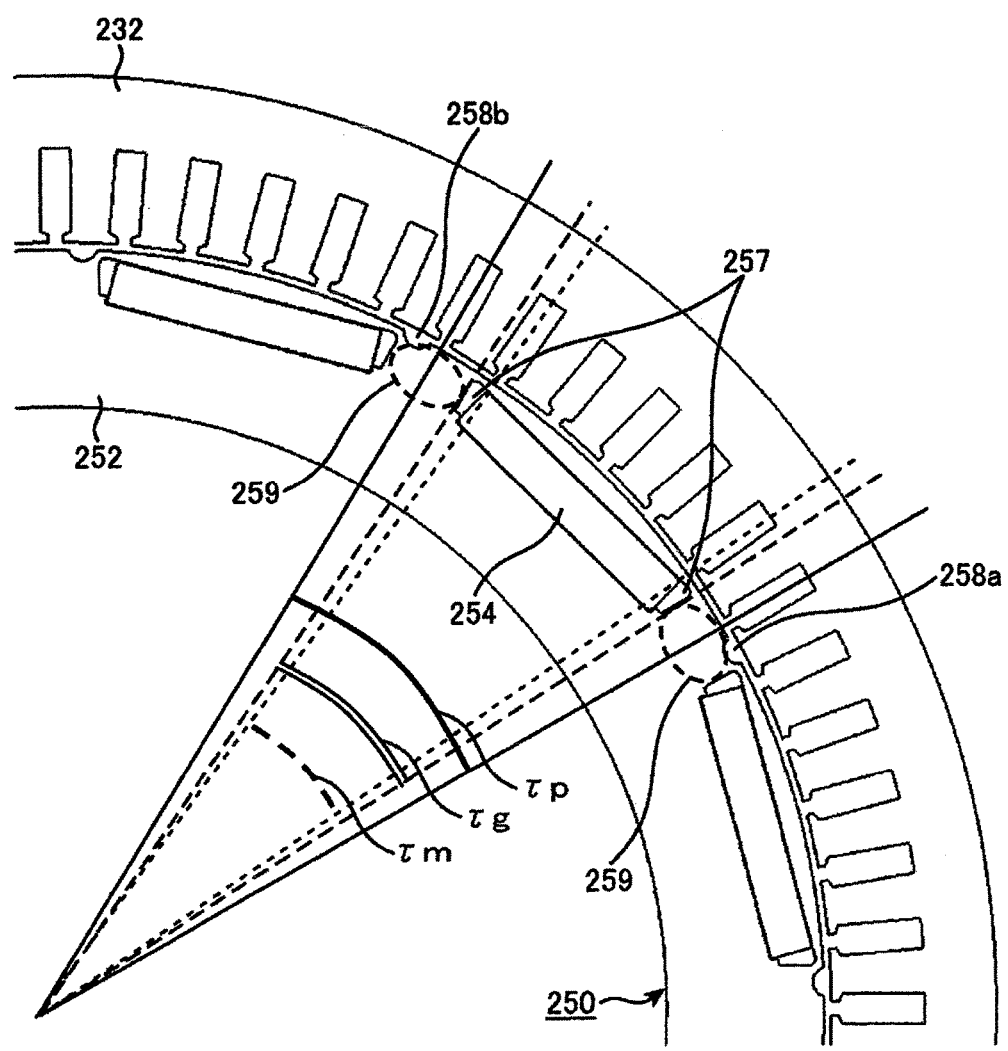
Figure 17:
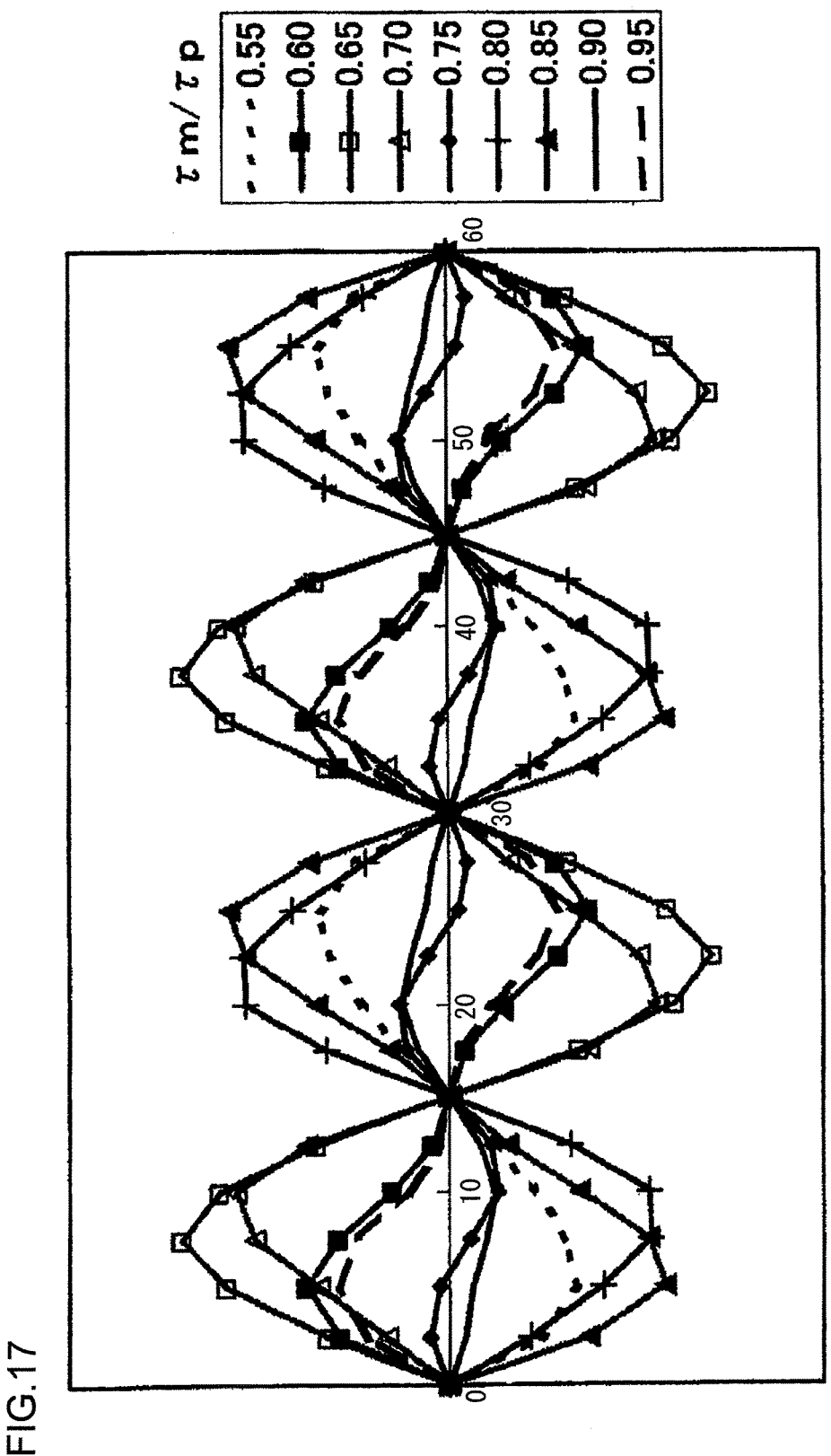

FIG. 16 and FIG. 17 present diagrams in reference to which a cogging torque reducing method will be described. FIG. 16 shows part of the rotor 250 and the stator core 232 in a sectional view. In FIG. 16, τp and τm respectively represent the pole pitch between the poles formed via the permanent magnets 254 and the width angle of the permanent magnets 254. In addition, τg represents the sum of the width angle accounted for by a permanent magnet 254 and the gaps 257 present on the two sides thereof, i.e., the width angle of the holes 253 shown in FIG. 4. The cogging torque can be reduced by adjusting the ratios of these angles τm/τp and τg/τp. In the description of the embodiment, the ratio τm/τp will be referred to as a degree of the magnet pole arc and the ratio τg/τp will be referred to as a degree of magnet hole pole arc.

FIG. 17 is a diagram indicating the relationship between the ratio τm/τp representing the degree of magnet pole arc and the cogging torque. It is to be noted that the results presented in FIG. 17 are obtained by assuming that τm=τg and that the permanent magnet 254 and the gaps 257 thereat form a fan shape concentric with the circle defined by the outer circumference of the rotor 250. While the optimal values are bound to be slightly different when rectangular magnets are used, as in the embodiment, it will be obvious that the principle presented in FIG. 17 is applicable to the present invention as well. In FIG. 17, the amplitude of the cogging torque is indicated along the vertical axis and the rotational angle of the rotor 250 is indicated in electrical angle along the horizontal axis. The amplitude of pulsation changes depending upon the value representing the ratio τm/τp, and the cogging torque can be reduced by selecting a value of approximately 0.75 for τm/τp when τm=τg. In addition, the tendency whereby the cogging torque is not affected by the magnetic gaps 258 described in reference to FIG. 13(a), remains in place regardless of which of the values indicated in FIG. 17 is taken for the ratio τm/τp of the magnet width angle to the pole pitch. Namely, no matter what positions are assumed by the magnetic gaps 258, the relationship shown in FIG. 17 remains the same.

Figure 18:
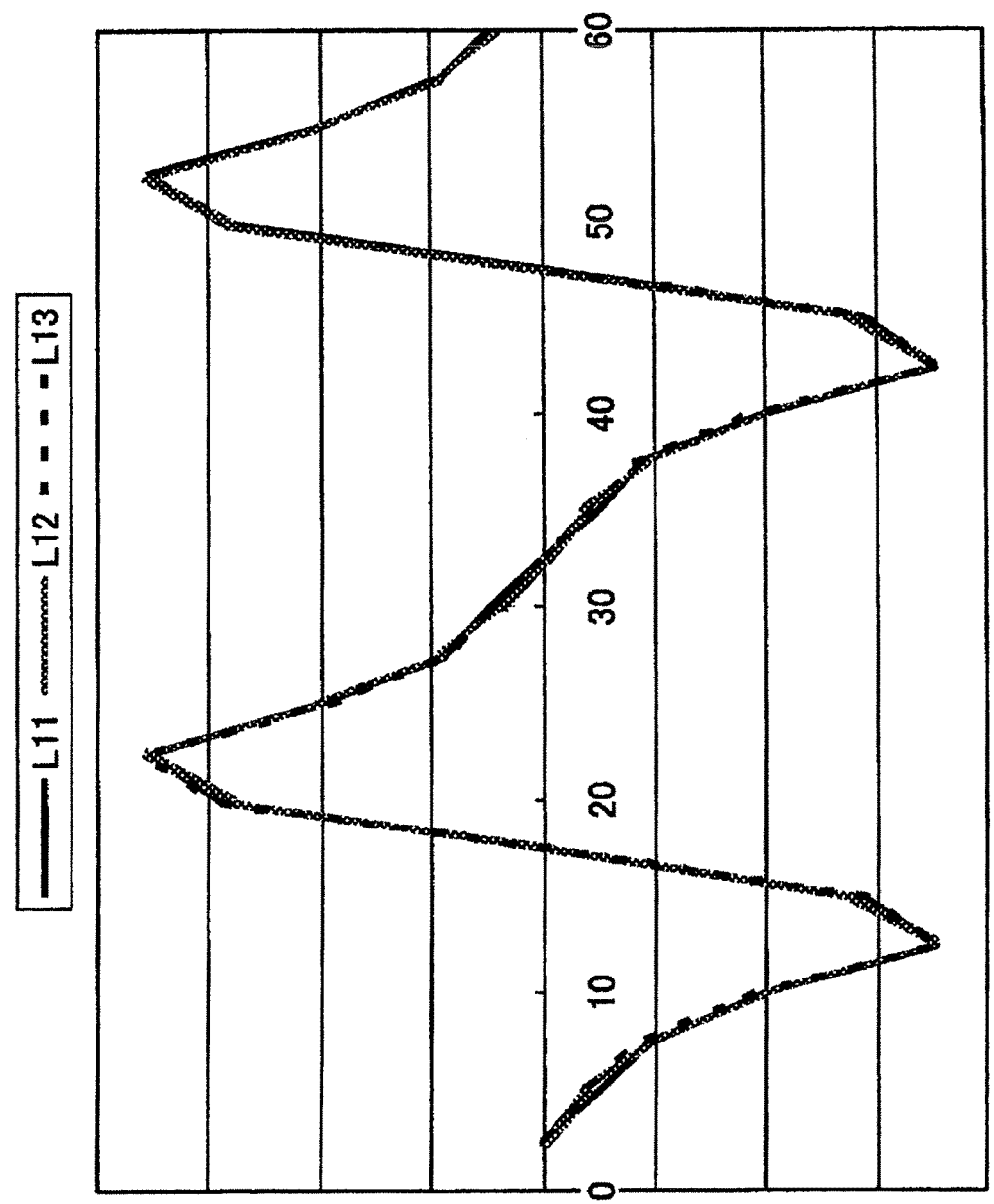

FIG. 18 shows waveforms of the cogging torque. The rotational angle of the rotor is indicated in electrical angle along the horizontal axis. A line L11 is the waveform of the cogging torque manifesting in the rotor in the rotating electric machine corresponding to FIG. 15(a) with the area 401 having the magnetic gaps 258 formed thereat and the area 402 with no magnetic gaps 258 set in an alternating pattern, a line L12 is the waveform of the cogging torque manifesting in the rotor in the rotating electric machine corresponding to FIG. 15(b), which includes only the areas 401 each having the magnetic gaps 258 formed thereat, and a line L13 is the waveform of the cogging torque manifesting in the rotor in the rotating electric machine corresponding to FIG. 15(c), which includes only areas 402 with no magnetic gaps 258 formed thereat. FIG. 16(a) demonstrate that the presence/absence of the magnetic gaps 258 has little effect on the cogging torque.

Figure 19:
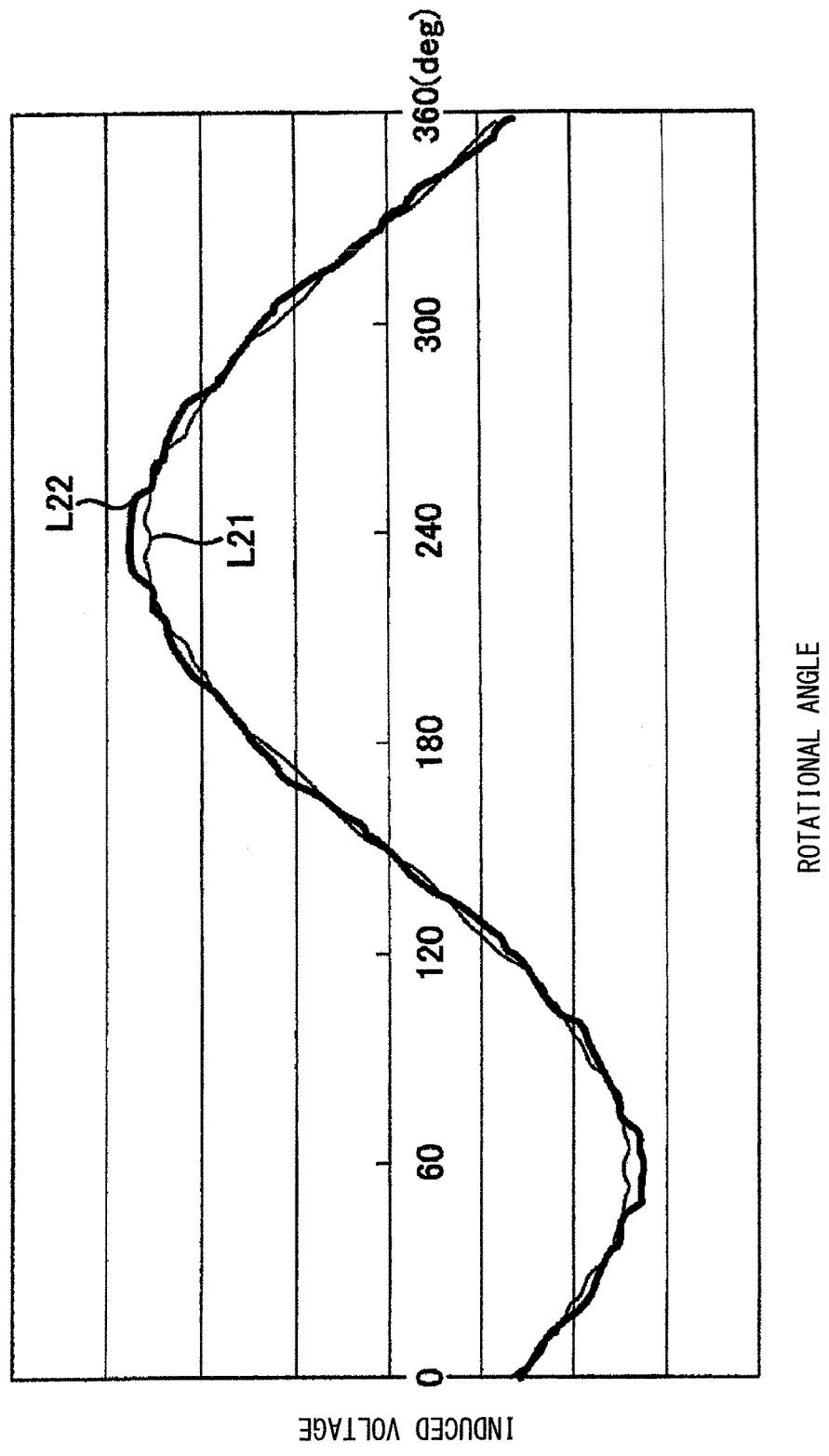
Figure 20:
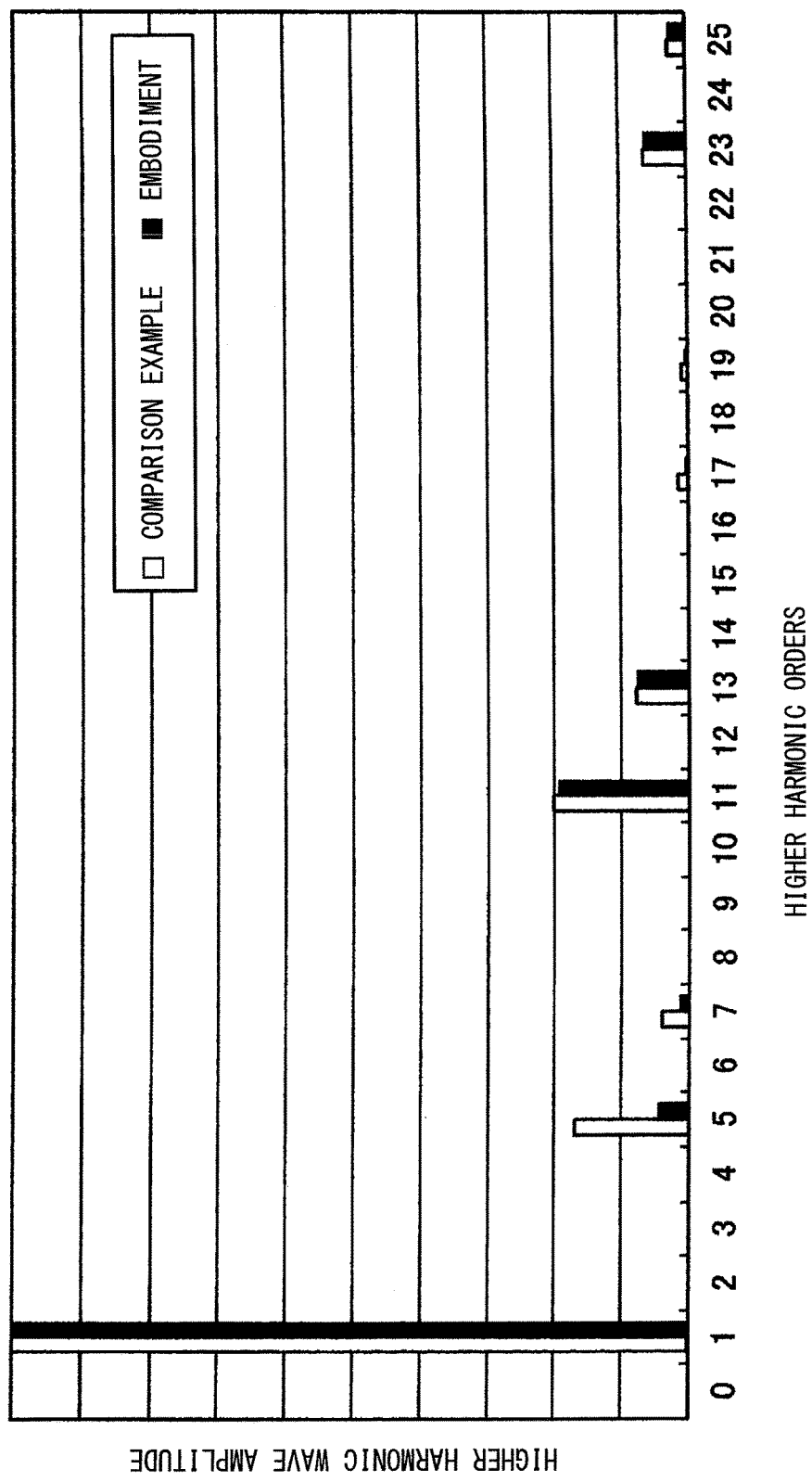

FIG. 19 is a diagram indicating the waveforms of the induced voltages. A curve L21 represents the waveform of the induced voltage in the rotating electric machine achieved in the embodiment by adopting the slot conductor positional arrangement shown in FIG. 11, whereas a curve L22 represents the waveform of the induced voltage in a comparison example adopting the stator structure disclosed in patent literature 1. In addition, FIG. 20 presents the results obtained by conducting higher harmonic analysis on the induced voltage waveforms shown in FIG. 19.

FIG. 19 indicates that the induced voltage waveform represented by the curve L21 more closely resembles the sine wave than the induced voltage waveform represented by the curve L22. In addition, the higher harmonic analysis results presented in FIG. 20 indicate that the 5th-order higher harmonic component and the 7th-order higher harmonic component can be reduced by significant extents through the embodiment.

The results presented in FIG. 15 through FIG. 20 indicate that while the magnetic gaps 258, embodying a characteristic feature of the rotor structure according to the present invention, do not affect the cogging torque and the induced voltage, the cogging torque can be reduced by adjusting the ratio representing the degree of magnet pole arc τm/τp, through a method known in the related art and the higher harmonic component in the induced voltage can be reduced by adopting the stator structure according to the present invention. In other words, the cogging torque and the induced voltage can be individually reduced independently of each other.

Next, the load characteristics in the applying current state will be described.

The rotating electric machine achieved in the embodiment is a motor with six slots allocated to each pole. In this rotating electric machine, the slot conductors 233 constituting the stator winding 238 are disposed in the slots 237 of the stator core 232 as illustrated in FIG. 11. This arrangement makes it possible to reduce the 5th-order higher harmonic component and the 7th-order higher harmonic component in the induced voltage, as indicated in FIG. 20, and as a result, the 6th-order torque pulsation, unique to three-phase motors and attributable to these higher harmonic components, can be reduced.

Figure 21:
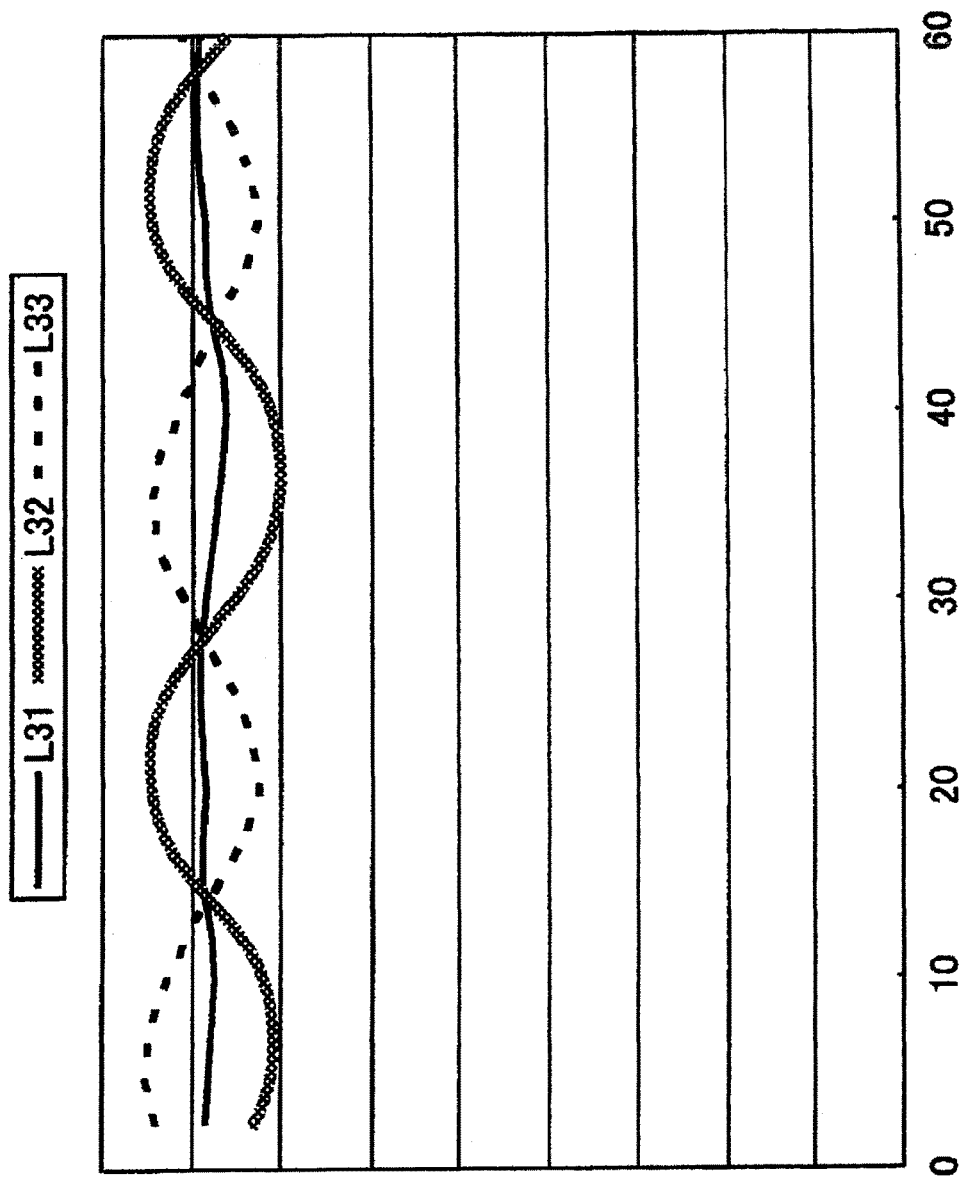

FIG. 21 shows waveforms of the torque to manifest in the applying current state. The rotational angle of the rotor is indicated in the electrical angle along the horizontal axis. A line L31 is the waveform of the torque manifesting in the rotor of the rotating electric machine corresponding to FIG. 15(a), which includes the area 401 with the magnetic gaps 258 formed thereat and the area 402 without magnetic gaps 258 set in the alternating pattern, a line L32 is the waveform of the torque manifesting in the rotating electric machine corresponding to FIG. 15(b) which only includes areas 401 each having the magnetic gaps 258 formed thereat, and a line L33 is the waveform of the torque manifesting in the rotating electric machine corresponding to FIG. 15(*c*), which only includes areas 402 with no magnetic gaps 258 formed thereat.

Figure 15:
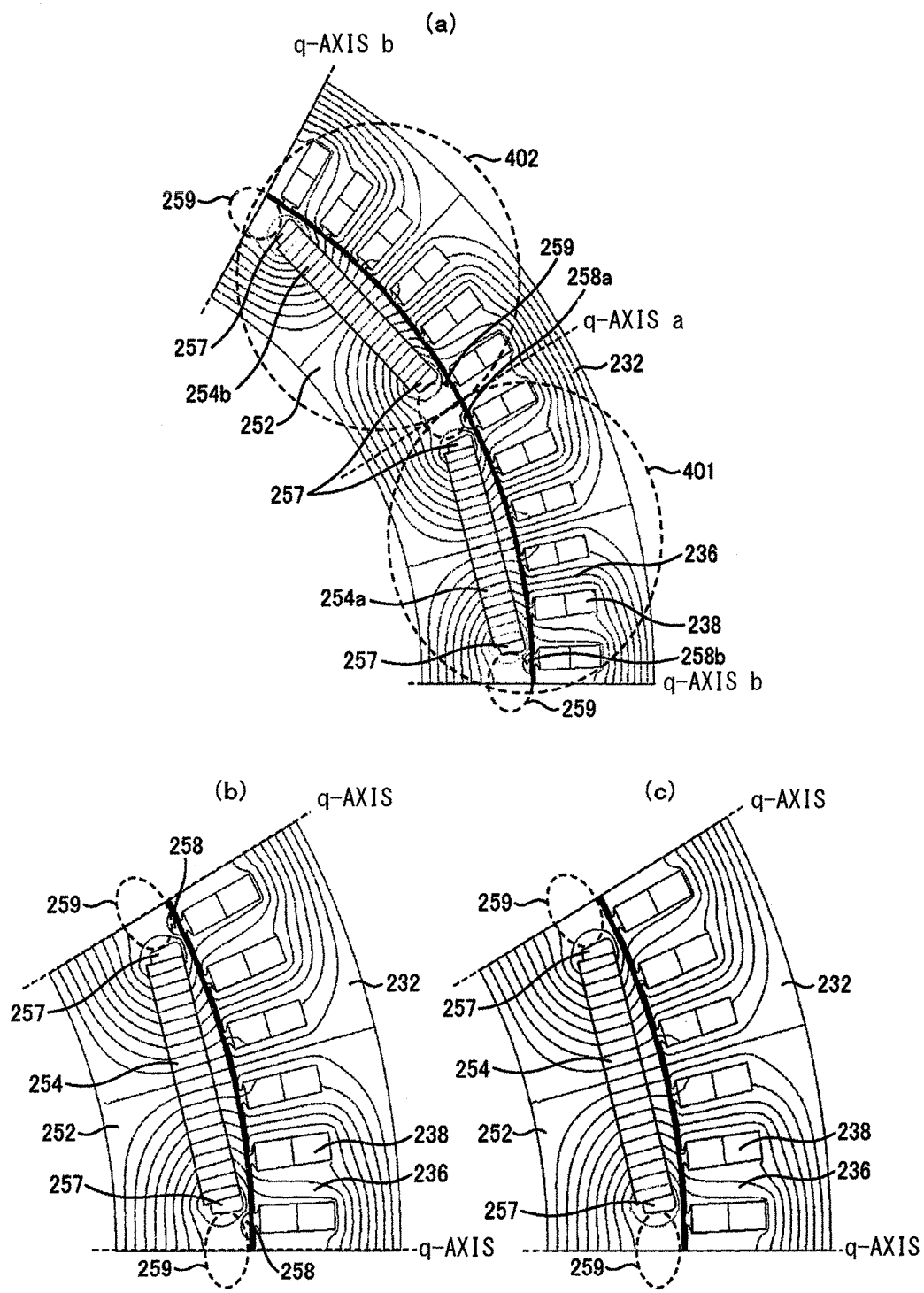

FIG. 21 indicates that the dominant torque pulsation component in the rotating electric machine achieved in the embodiment is the 12th-order torque pulsation component, i.e., the component with 30° cycles in electrical angle with hardly any 6th-order component present in the torque. In addition, the figure indicates that the torque pulsation waveforms L 31 and L 32 both change relative to the torque pulsation waveform L 33 corresponding to the rotating electric machine that does not include any magnetic gaps 258 formed therein, i.e., the rotating electric machine with areas 402 alone. This means that the magnetic fluxes in the applying current state are affected by the magnetic gaps 258. In addition, the phase of the torque pulsation L 32 manifesting in the rotating electric machine having the areas 401 alone and the phase of the torque pulsation L33 manifesting in the rotating electric machine having the areas 402 alone are substantially the reverse of each other. As shown in FIG. 15(*a*), the rotating electric machine achieved in the embodiment assumes a structure having the area 401 and the area 402 set in the alternating pattern, and the total torque pulsation to which the entire rotor is subjected is the average of the torque pulsation L 32 and the torque pulsation L 33, as indicated by the torque pulsation waveform L 31.

In the embodiment described above, the torque pulsation in the applying current state can be reduced due to the presence of the magnetic gaps 258a and 258b formed as described earlier. In order to assure such torque pulsation reducing effect, it is desirable that the width angle (the angle measured along the circumferential direction) of the grooves forming the magnetic gaps 258 be set within a range of ¼~½ of the pitch angle of the teeth 236. It is to be noted that a similar effect can be achieved with magnetic gaps set so as to achieve symmetry relative to the q-axis passing through the center of the magnetic pole and to achieve asymmetrical positions relative to the d-axis passing through the centers of the salient poles. In addition, more than two different types of magnetic gaps 258 may be formed at the auxiliary salient pole portions 259. In such a case, the torque pulsation can be reduced with a greater degree of freedom and pulsation reduction can be achieved through finer adjustment.

Moreover, the present invention is characterized in that the torque does not decrease as much as in a rotating electric machine without any magnetic gaps. In the skew structure, designed to reduce torque pulsation in the related art, the torque is bound to decrease because of the skew, and thus, the skew structure does not facilitate miniaturization. The embodiment, in contrast, achieves an added advantage in that the torque is not lowered, as well as assuring a reduction of torque pulsation in the applying current state independently of a reduction of the cogging torque. This advantage is attributed to the dominance of the 12th-order component in the torque pulsation occurring in a rotor without any grooves and the positional arrangement assumed for the slot conductors 233 shown in FIG. 11 is also a contributing factor.

Figure 12:
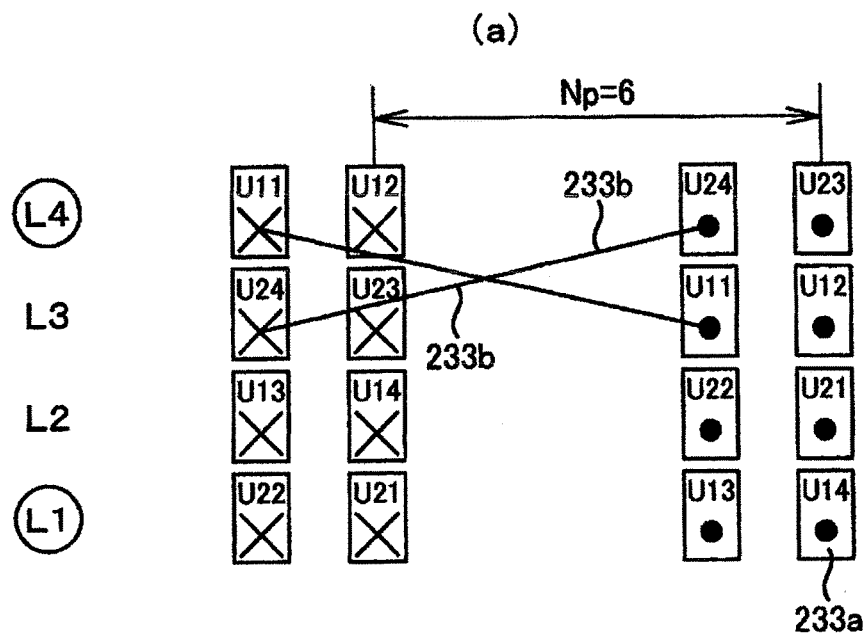
Figure 12:
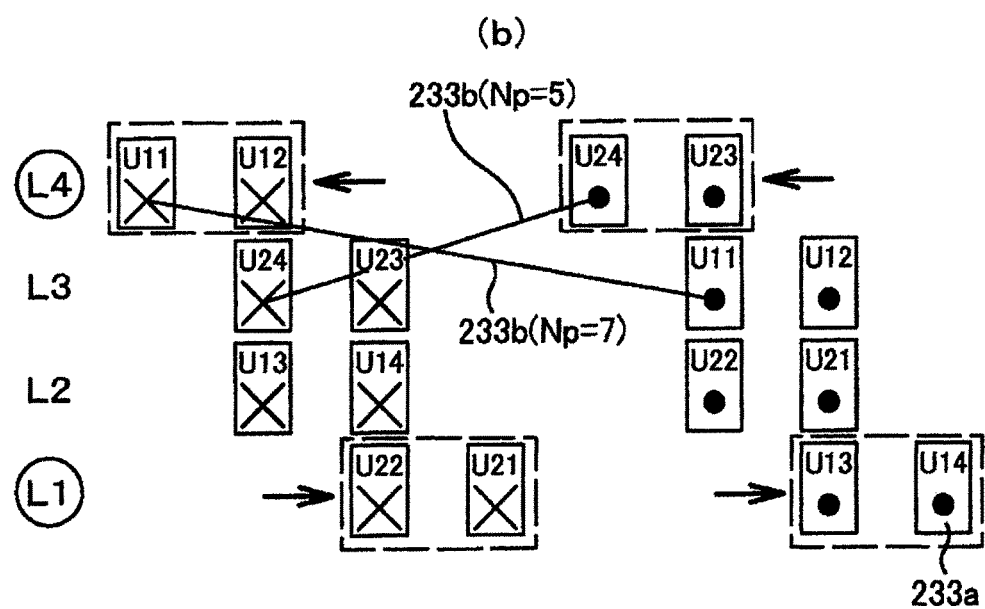
Figure 22:
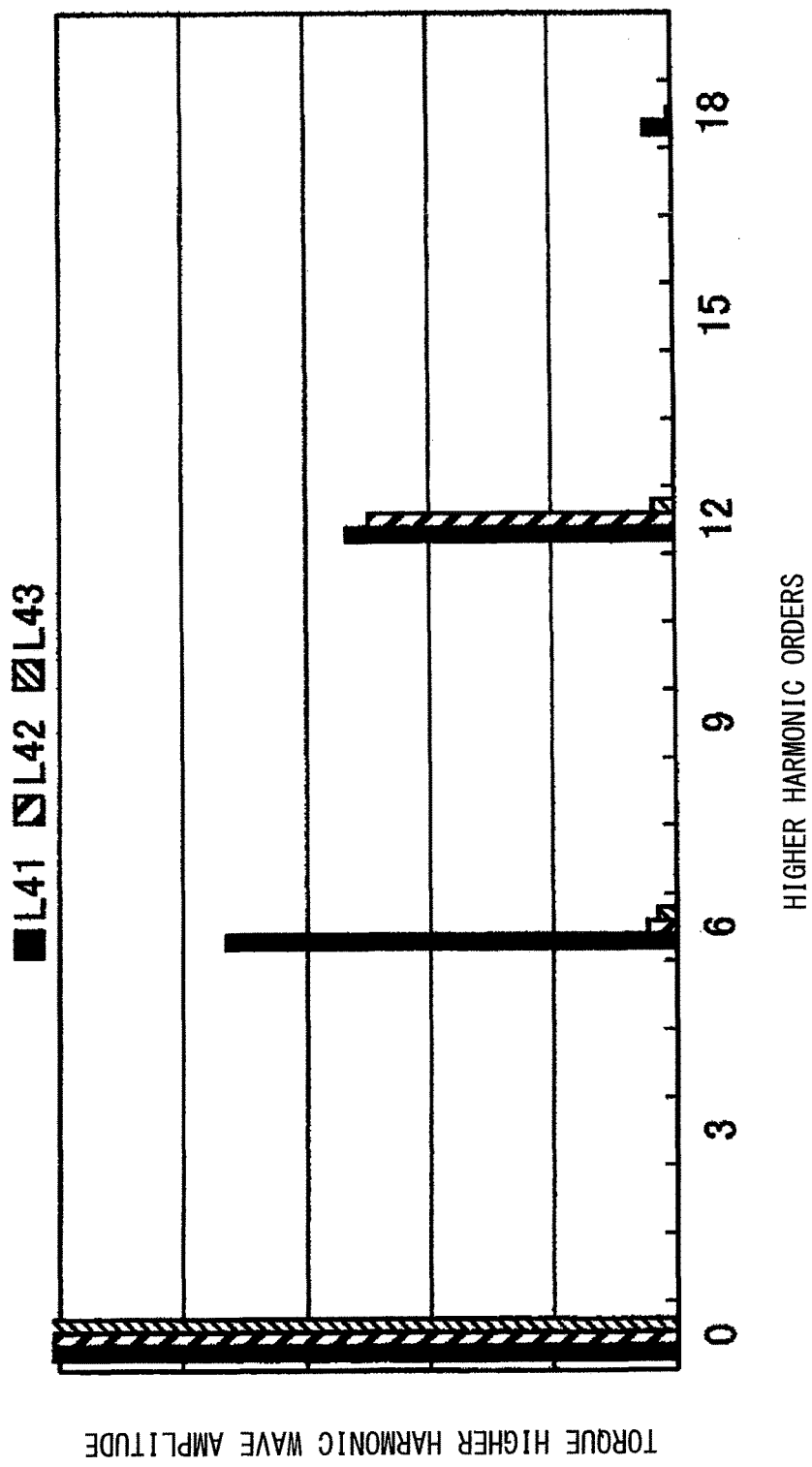

FIG. 22 presents the results of higher harmonic analysis conducted for the waveforms of the torque manifesting in the applying current state. A line L41 represents the waveform of the torque manifesting in a rotating electric machine with the slot conductors 233 disposed as shown in FIG. 12(*a*) and the rotor thereof having no magnetic gaps 258 formed thereat, as shown in FIG. 15(*c*). A line L42 represents the waveform of the torque manifesting in a rotating electric machine with the slot conductors 233 disposed by adopting the embodiment shown in FIG. 12(*b*) with the rotor thereof having no magnetic gaps 258 formed thereat, as shown in FIG. 15(*c*). A line L43 represents the waveform of the torque manifesting in a rotating electric machine with the slot conductors 233 disposed by adopting the embodiment shown in FIG. 12(*b*) and the rotor thereof adopting the structure of the embodiment, as shown in FIG. 15(*a*).

The line L42 in the higher harmonic analysis results presented in FIG. 22 clearly shows a decrease in the 6th-order component, i.e. the component with the 60° cycles in electrical angle, over the 6th-order component represented by the line L41. This decrease is attributable to the positional arrangement shown in FIG. 12(*b*) illustrating the embodiment, adopted for the slot conductors 233. In addition, the line L43 shows a distinct decrease in the 12th-order component, i.e., the component with the 30° cycles in electrical angle, over the 12th-order component represented by the line L42. This decrease is attributable to the structure shown in FIG. 15(*a*) illustrating the embodiment, adopted for the rotor. Namely, torque ripple components with different higher harmonic orders can be reduced independently of each other.

While the torque ripple can be reduced by adopting the embodiment, an electromagnetic exciting force, which causes toroidal vibration of the stator core 232, may occur as torque is generated in the rotating electric machine and this toroidal vibration may cause noise.

Figure 23:
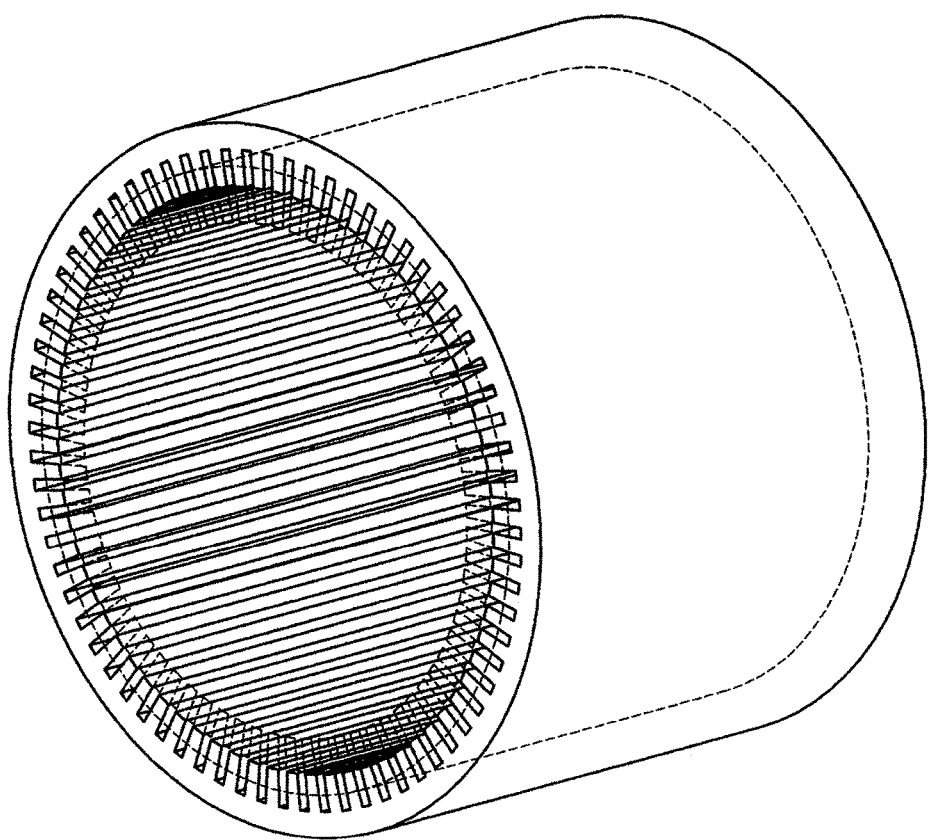

FIG. 23 shows the vibration mode for the toroidal 0th-order component at the stator core 232. It is to be noted that the initial shape of the stator core 232 is indicated by the thin line. This vibration mode causes noise as it resonates with the electromagnetic exciting force containing the matching toroidal 0th-order component. However, the level of the toroidal 0th-order electromagnetic exciting force corresponds to the level of the torque ripple and thus, the toroidal 0th-order electromagnetic exciting force can be reduced by reducing the torque ripple. Namely, the toroidal 0th-order electromagnetic exciting force occurring at the stator core 232 of the embodiment can be reduced in much the same way as the torque ripple.

Figure 13:
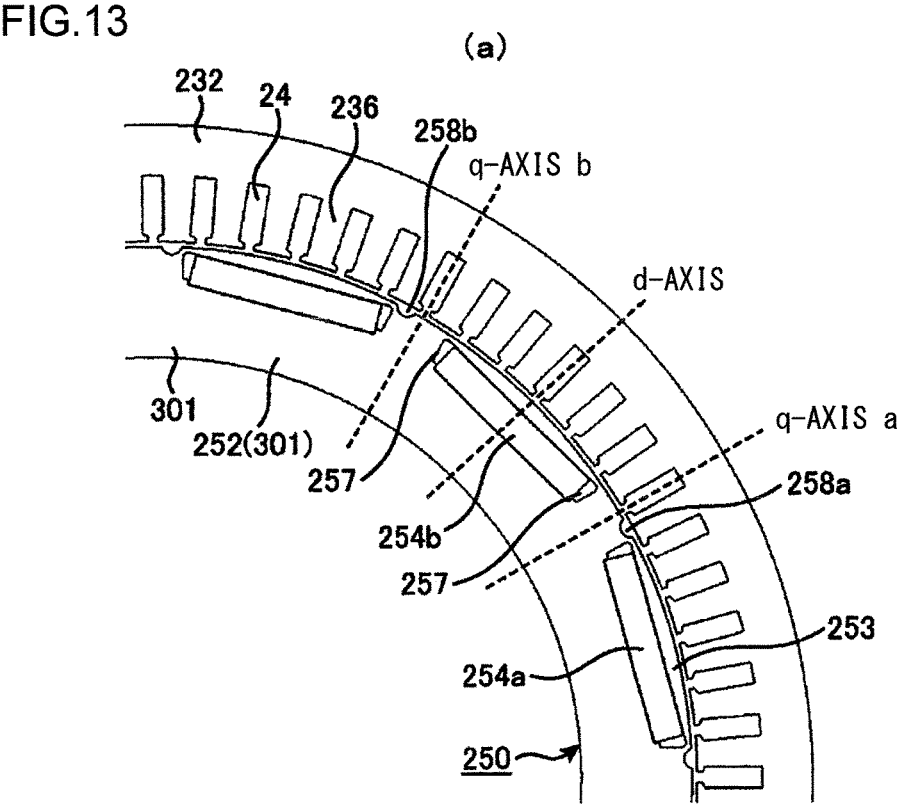
Figure 13:
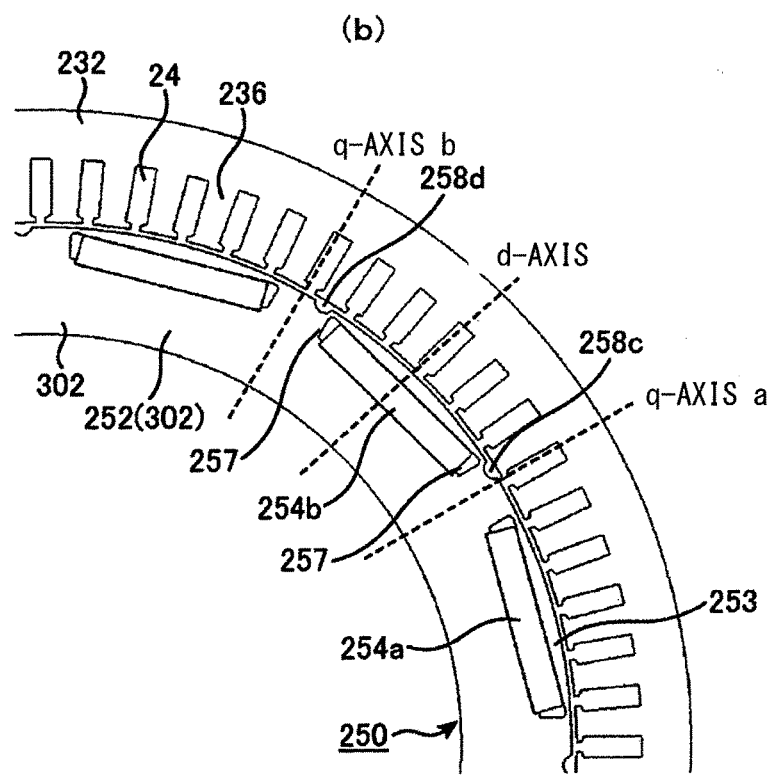
Figure 24:
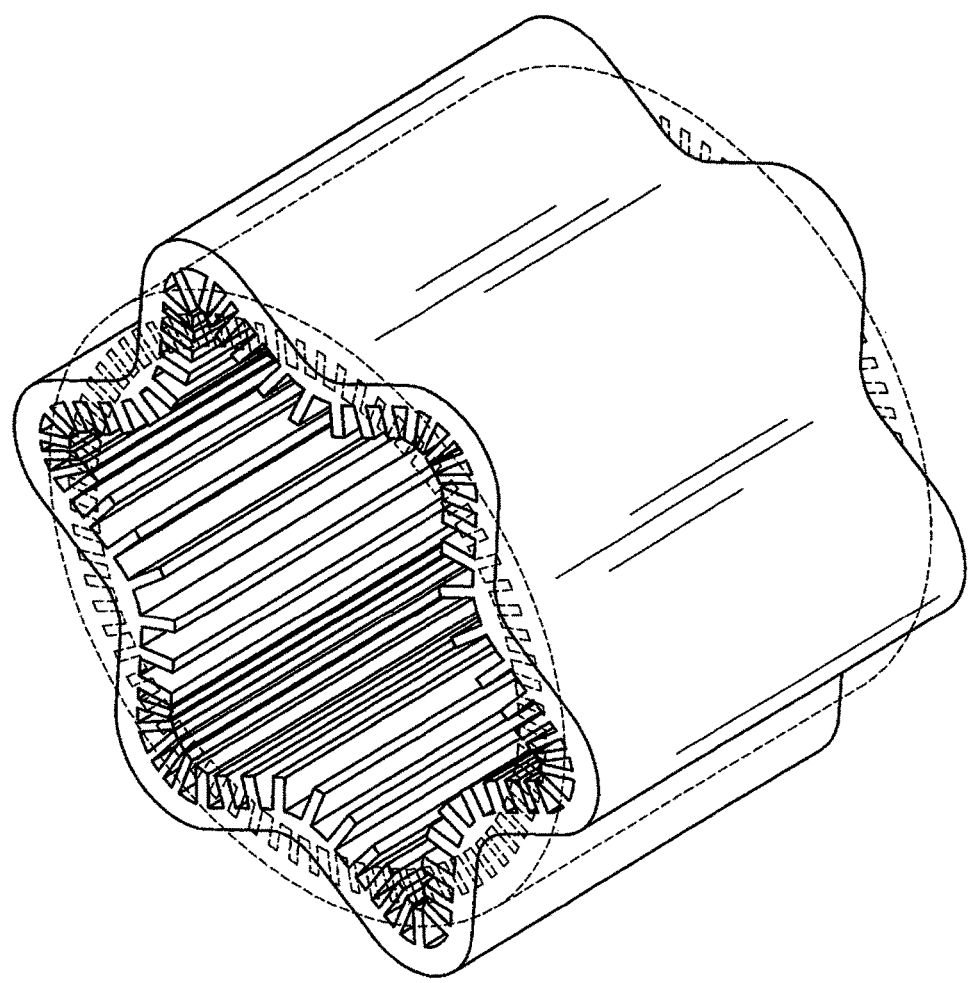

FIG. 24 shows the vibration mode for the toroidal 6th-order component at the stator core 232. It is to be noted that the initial shape of the stator core 232 is indicated by the thin line. This vibration mode causes noise as it resonates with the electromagnetic exciting force containing the matching toroidal 6th-order component. In the embodiment, the magnetic gaps 258 are formed in correspondence to each pole, as illustrated in FIG. 13(*a*). As a result, a magnetic imbalance is created among the poles and an exciting force assuming a toroidal order that is ½ of the number of poles is generated at each of the cores 301 and 302 shown in FIG. 13. However, since the magnetic gaps 258 at the cores 301 and the magnetic gaps 258 at the core 302 are set at positions offset relative to each other by one magnetic pitch, the electromagnetic exciting forces, canceled out along the axial direction, do not resonate with the toroidal 6th-order vibration mode.

Figure 25:
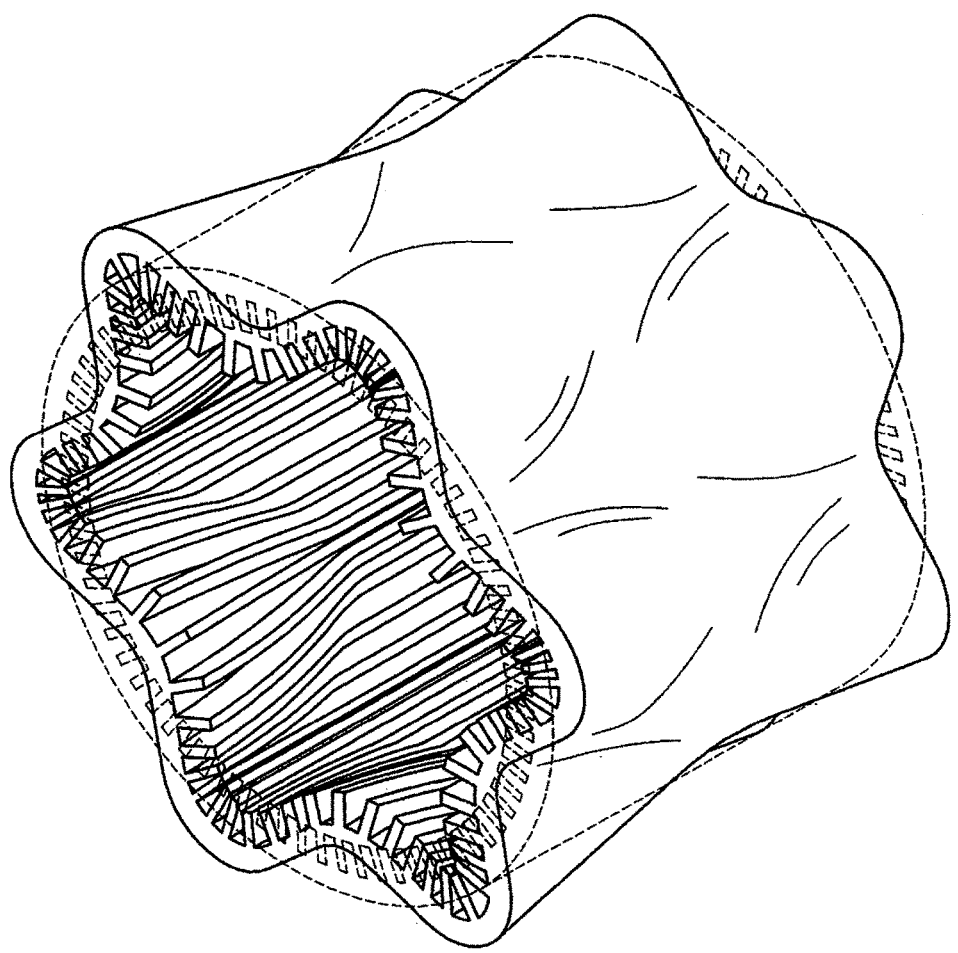

FIG. 25 shows a vibration mode containing the toroidal 6th-order component at the stator core 232, in which the phase at one end of the stator is the reverse of the phase at the other end of the stator facing opposite the one end along the axial direction. It is to be noted that the initial shape of the stator core 232 is indicated by the thin line. The phases of the electromagnetic exciting forces generated at the cores 301 and at the core 302 are the reverse of each other, as has been described earlier, and, for this reason, resonance will occur if the rotor core adopts a two-stage structure achieved with one type of core 301 and another type of core 302. However, in conjunction with the rotor core adopting a three-stage structure, as in the embodiment, the electromagnetic exciting forces do not resonate with this vibration mode. In addition, it will be obvious that two or more types of cores may be used to configure a rotor core with more than three stages to achieve advantages similar to those of the embodiment.

Second Embodiment

Figure 26:
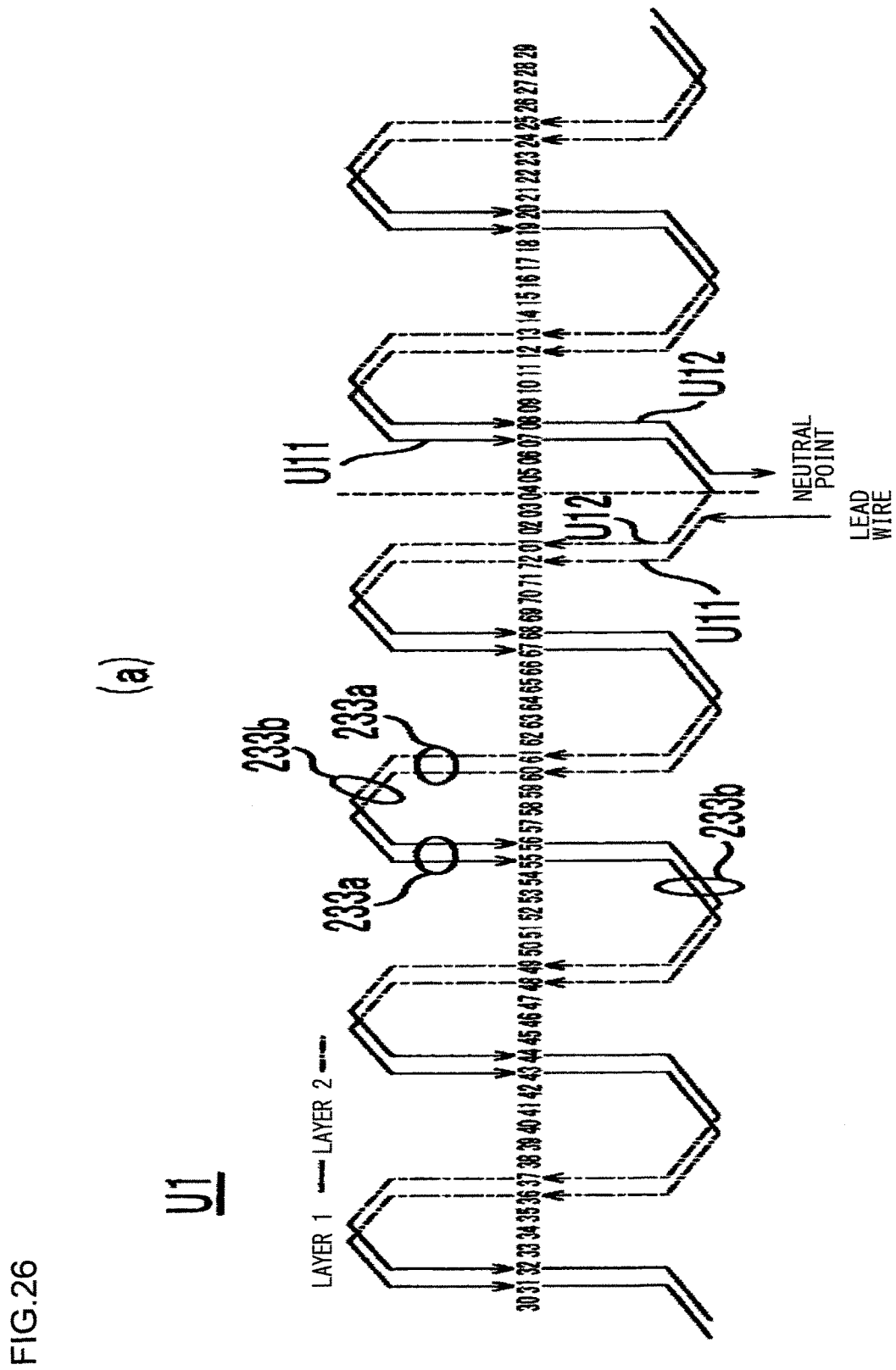
Figure 26:
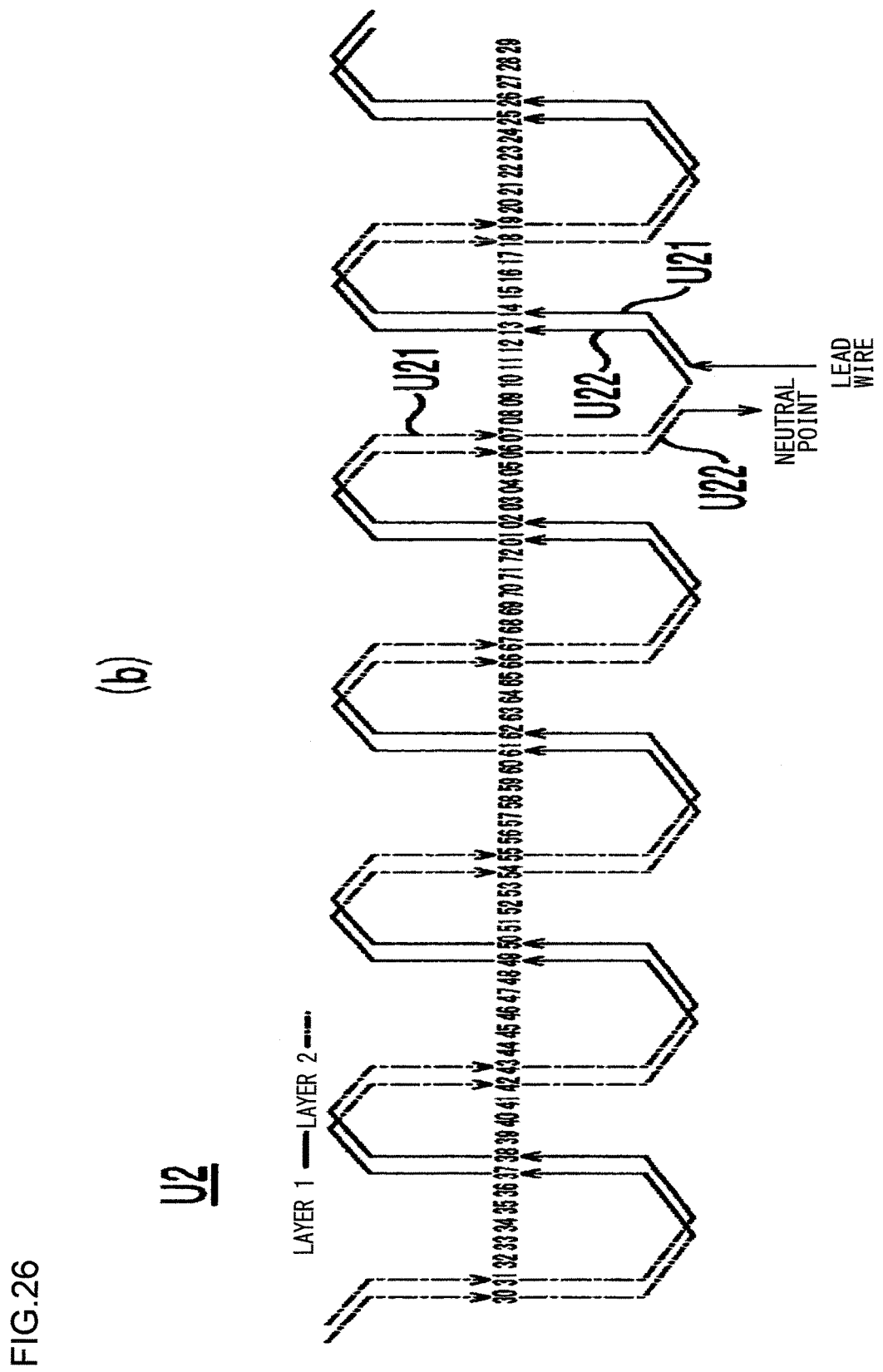
Figure 27:
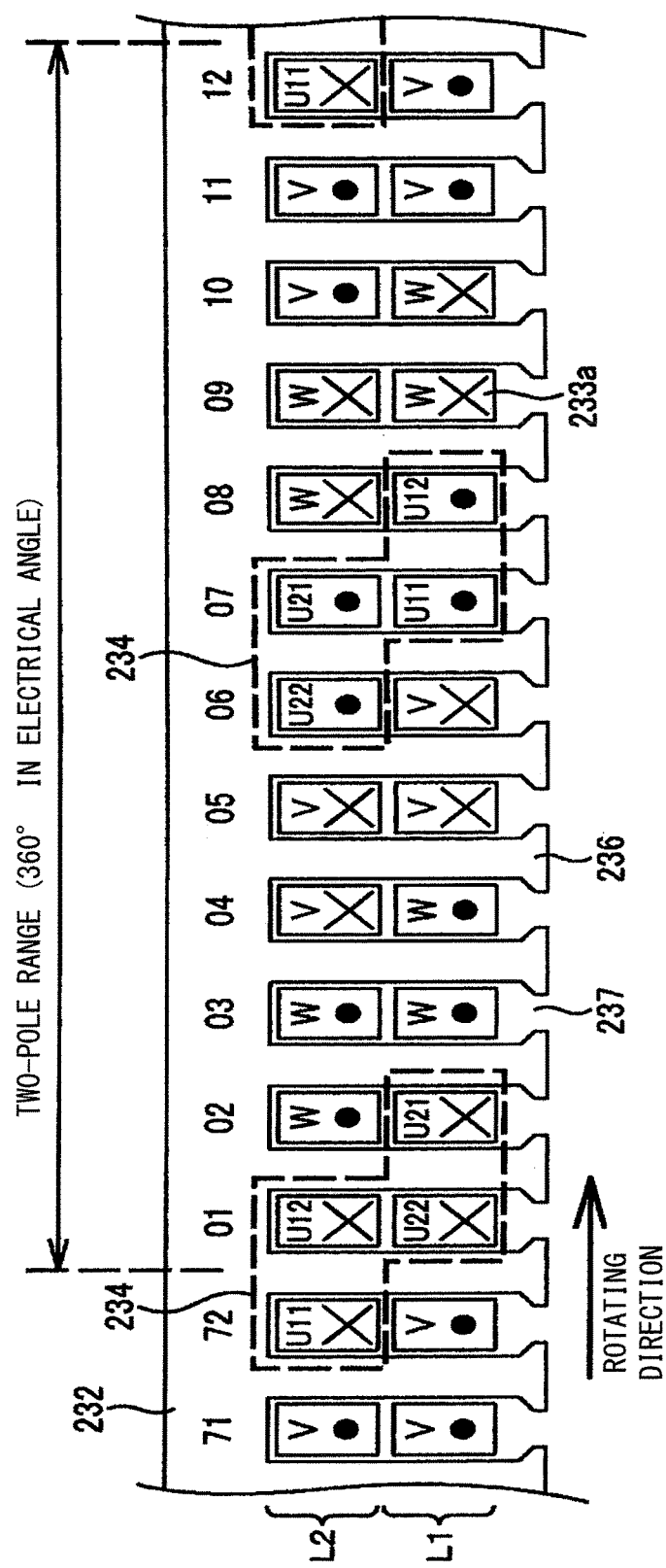

FIG. 26 and FIG. 27 illustrate the second embodiment of the present invention achieved by adopting the present invention in a stator with the number of slots per pole per phase NSPP set to 2 and slot conductors 233a inserted in each slot 237 in two layers. The rotor assumes a structure similar to that described in reference to the first embodiment. FIG. 26 is a detailed connection diagram pertaining to the U-phase winding constituting part of the stator winding, with FIG. 26(a) showing the U1-phase winding group and FIG. 26(b) showing the U2-phase winding group. FIG. 27 shows the positional arrangement with which the slot conductors 233a are disposed at the stator core 232.

As shown in FIG. 26(b), the coil winding U11 in the U1-phase winding group, starting at the lead wire, enters the slot assigned with slot No. 72 as a layer-2 slot conductor, and then extends astride a range equivalent to five slots as a cross conductor 233b before moving into the slot assigned with slot No. 67 as a layer-1 slot conductor. Then, the coil winding leaves the layer-1 position in the slot assigned with slot No. 67, runs astride a range equivalent to seven slots and leads into the slot assigned with slot No. 60 as a layer-2 slot conductor. Subsequently, the coil winding is continuously wound in a wave winding pattern with the cross conductors running astride the five slot range and the seven slot range alternately until it is inserted through the slot assigned with slot No. 07 as a layer-1 slot conductor after encircling the stator core 232 by substantially a full turn. The winding ranging from the lead wire through the layer-1 position in the slot assigned with slot No. 07 forms the coil winding U11.

The winding, having left the layer-1 position in the slot assigned with slot No. 07 runs astride a range equivalent to six slots and then leads into the slot assigned with slot No. 01 as a layer-2 slot conductor. The coil winding U12, which starts at the layer-2 position in the slot assigned with slot No. 01, is continuously wound with the wave winding pattern with the cross conductors running astride the five slot range and the seven slot range alternately, as in the coil winding U11, until it leads into the slot assigned with slot No. 08 as a layer-1 slot conductor after encircling the stator core 232 by substantially a full turn.

The coil windings in the U2-phase winding group, too, are wound with a wave winding pattern as are the coil windings in the U1-phase winding group. The coil winding U21 is wound with a wave winding pattern ranging from the layer-1 position in the slot assigned with slot No. 14 through the layer-2 position in the slot assigned with slot No. 07, whereas the coil winding U22 is wound to range from the layer-1 position in the slot assigned with slot No. 13 through the layer-2 position in the slot assigned with slot No. 06.

FIG. 27 shows the positional arrangement with which slot conductors 233a are disposed at the slots assigned with slot Nos. 01 through 12 and slot Nos. 71 and 72. In this figure, the 12-slot pitch covering the slot assigned with slot No. 01 through the slot assigned with slot No. 12 corresponds to two poles. The positional arrangement with which the slot conductors 233a corresponding to the U-phase, the V-phase and the W-phase are disposed as shown in FIG. 27 is identical to the positional arrangement with which the slot conductors 233a are disposed to take up layer-1 and layer-2 positions in FIG. 11. In the embodiment, the set of four slot conductors 233a inside each dotted line enclosure forms a single slot conductor group 234.

The slot conductor groups 234 formed in the embodiment, too, satisfy conditions similar to those having been described in reference to the slot conductor groups 234 (see FIG. 11) in the first embodiment. Namely:

(a) the cross conductors 233b connect slot conductors 233a by each running astride slots with the slot pitch Np set to N+1 (=7) on one coil end side and each running astride slots with the slot pitch Np set to N−1 (=5) on the other coil end side, with N (=6) representing the number of slots per pole;

(b) the stator winding includes slot conductor groups 234 each made up with a set of slot conductors 223b corresponding to a single phase, which are inserted through a predetermined number Ns (=3) of consecutive slots forming a continuous range along the circumference of the stator core so as to take up successive slot positions and layer positions; and (c) the predetermined number of slots Ns is set so that Ns=NSPP+NL=3 with NSPP (=2) representing the number of slots per pole per phase, when the number of layers is 2×NL (NL=1).

Consequently, the extent of torque ripple can be reduced and thus noise in the rotating electric machine is reduced, thereby ultimately achieving the object set fourth earlier, of noise reduction in the rotating electric machine, as in the first embodiment.

Third Embodiment

Figure 28:
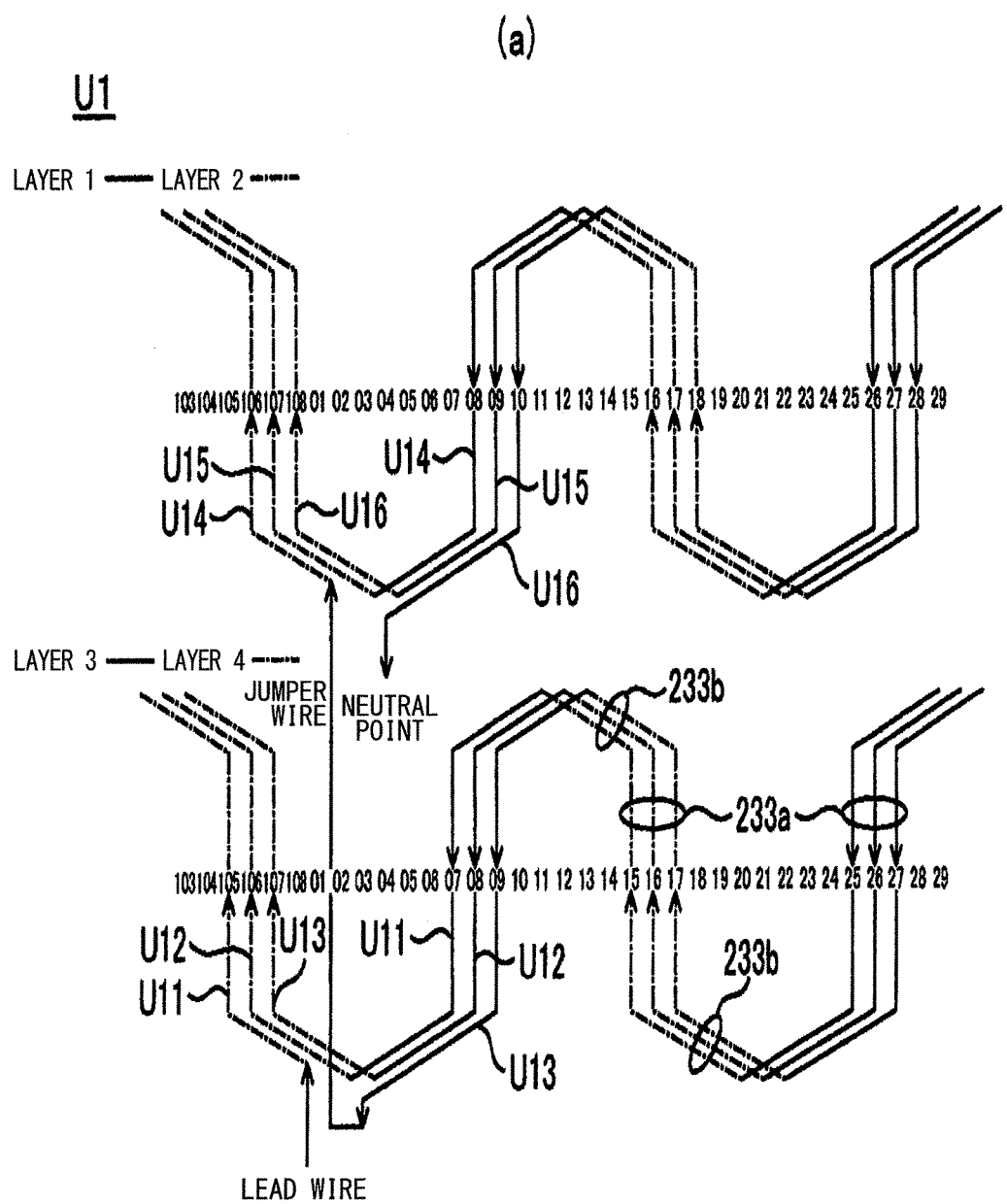
Figure 28:
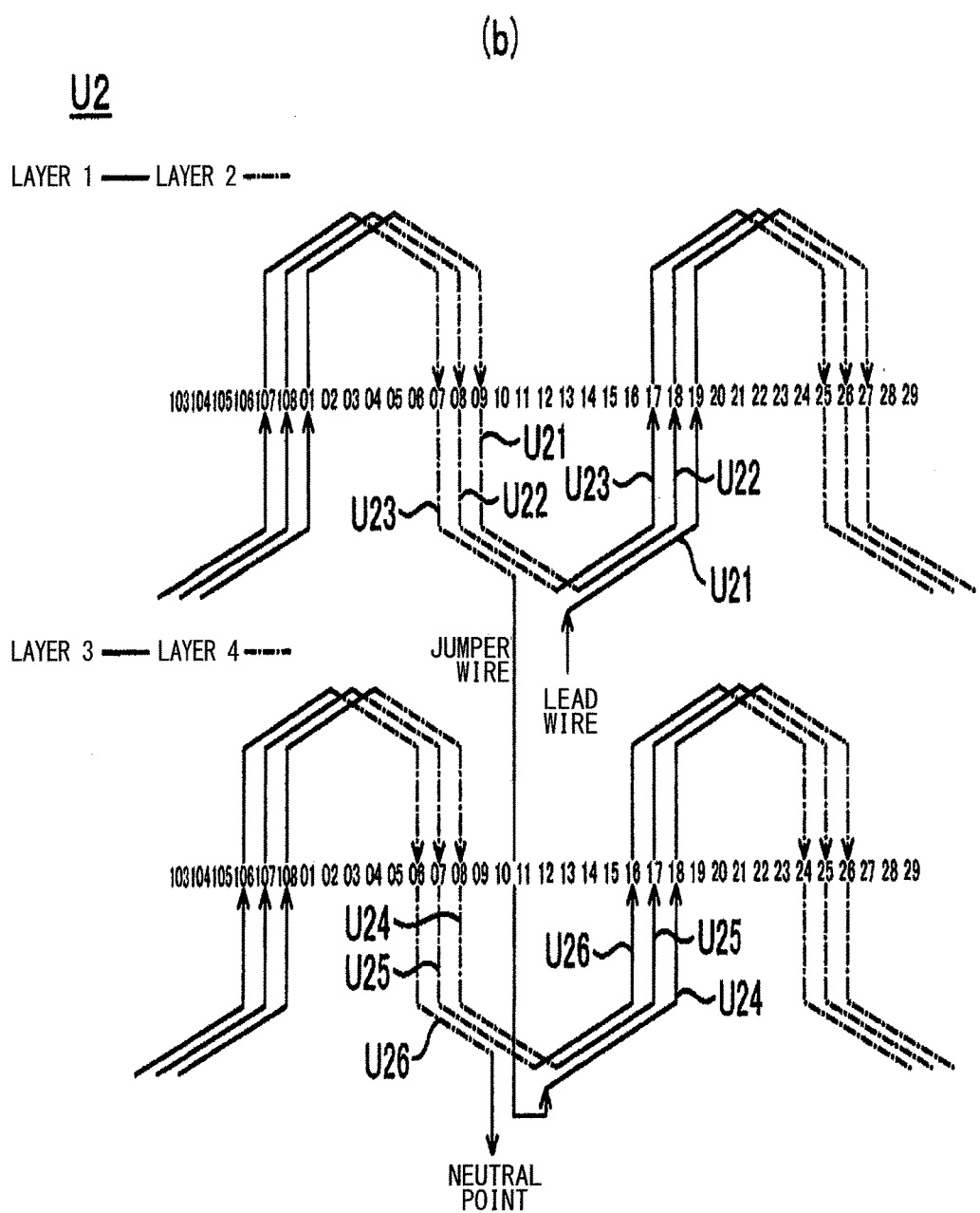
Figure 29:
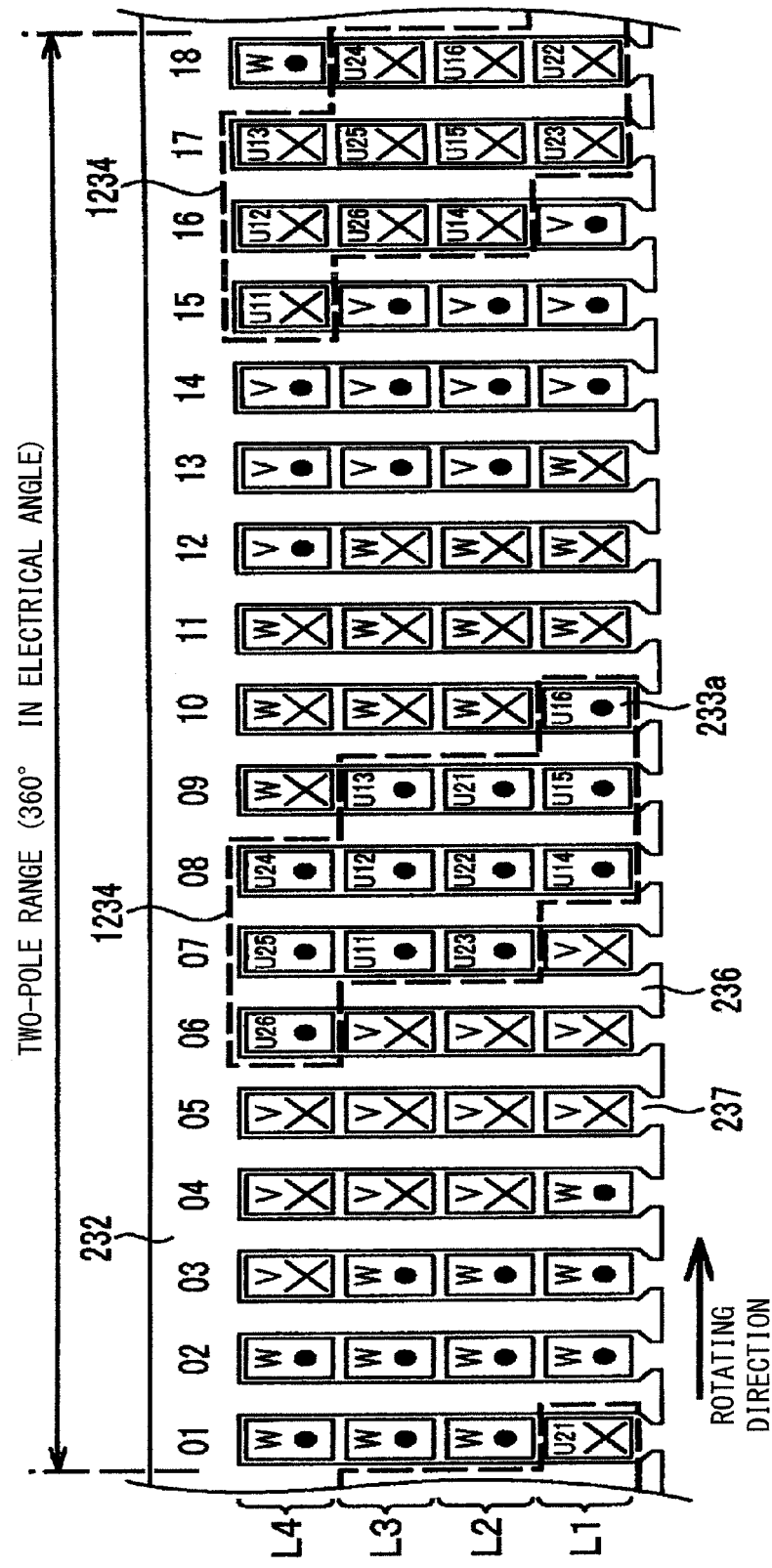

FIG. 28 and FIG. 29 illustrate the third embodiment of the present invention achieved by adopting the present invention in a stator with the number of slots per pole per phase NSPP set to 3 and slot conductors 233a inserted in each slot 237 in four layers. The rotor assumes a structure similar to that described in reference to the first embodiment. FIG. 28 is a detailed connection diagram pertaining to part of the U-phase winding, with FIG. 28(a) showing the U1-phase winding group and FIG. 28(b) showing the U2-phase winding group. FIG. 19 shows the positional arrangement with which the slot conductors 233a are disposed at the stator core 232.

As shown in FIG. 28, 108 slots are formed at the stator core 232 when the number of slots per pole per phase NSPP is 3 and slot conductors 233a are inserted through in each slot 237 in four layers (2×NL). At such a stator, the U1-phase winding group and the U2-phase winding group are each made up with six coil windings. In addition, the cross conductors in the coil windings run astride slots with a 5-slot pitch and a seven-slot pitch alternately.

In the U1-phase winding group shown in FIG. 28(a), the winding extending from the layer-4 position in the slot assigned with slot No. 105 through the layer-3 position in the slot assigned with slot No. 07 constitutes a coil winding U11, the winding extending from the layer-4 position in the slot assigned with slot No. 106 through the layer-3 position in the slot assigned with slot No. 08 constitutes a winding U12 and the winding extending from the layer-4 position in the slot assigned with slot No. 107 through the layer-3 position in the slot assigned with slot No. 09 constitutes a coil winding U13. The winding, having left the layer-3 position in the slot assigned with slot No. 09, leads into the slot assigned with slot No. 106 as a layer-2 slot conductor via a jumper wire. The winding extending from the layer-2 position in the slot assigned with slot No. 106 through the layer-1 position in the slot assigned with slot No. 08 constitutes a coil winding U14, the winding extending from the layer-2 position in the slot assigned with slot No. 107 through the layer-1 position in the slot assigned with slot No. 09 constitutes a coil winding U15, and the winding extending from the layer-2 position in the slot assigned with slot No. 108 through the layer-1 position in the slot assigned with slot No. 10 constitutes a coil winding U16.

In the U2-phase winding group shown in FIG. 28(b), the winding extending from the layer-1 position in the slot assigned with slot No. 19 through the layer-2 position in the slot assigned with slot No. 09 constitutes a coil winding U21, the winding extending from the layer-1 position in the slot assigned with slot No. 18 through the layer-2 position in the slot assigned with slot No. 08 constitutes a coil winding U22 and the winding extending from the layer-1 position in the slot assigned with slot No. 17 through the layer-2 position in the slot assigned with slot No. 07 constitutes a coil winding U13. The winding, having left the layer-2 position in the slot assigned with slot No. 07 leads into the slot assigned with slot No. 18 as a layer-3 slot conductor via a jumper wire. The winding extending from the layer-3 position in the slot assigned with slot No. 18 through the layer-4 position in the slot assigned with slot No. 08 constitutes a coil winding U24, the winding extending from the layer-3 position in the slot assigned with slot No. 17 through the layer-4 position in the slot assigned with slot No. 07 constitutes a coil winding U25, and the winding extending from the layer-3 position in the slot assigned with slot No. 18 through the layer-4 position in the slot assigned with slot No. 06 constitutes a coil winding U26.

FIG. 29 shows the positional arrangement with which the slot conductors 233a are inserted at the slots assigned with slot Nos. 01 through 18. In the embodiment, the 18-slot pitch ranging from slot No. 01 through slot No. 18 corresponds to two poles. As FIG. 28 indicates, the coil windings U14 through U16 and the coil windings U21 through U23 are each inserted at slots 237 alternately as a layer-1 slot conductor and as a layer-2 slot conductor, whereas the coil windings U11 through U13 and the coil windings U24 through U26 are each inserted at slots 237 alternately as a layer-3 slot conductor and as a layer-4 slot conductor. A slot conductor group 1234 is formed with a set of twelve slot conductors 233a inside a dotted line enclosure in FIG. 29. The twelve slot conductors 233a are all part of the twelve coil windings U11 through U16 and U21 through U26 corresponding to the same phase.

As do the twelve slot conductors 233a corresponding to the U-phase, twelve slot conductors 233a corresponding to either of the other phases, i.e., the V-phase or the W-phase, together form a slot conductor group. As in the first embodiment, a slot conductor group made up with slot conductors 233a corresponding to the U-phase and each appended with the filled circle mark, a slot conductor group made up with slot conductors 233a corresponding to the W-phase and each appended with the cross mark, a slot conductor group made up with slot conductors 233a corresponding to the V-phase and each appended with the filled circle mark, a slot conductor group made up with slot conductors 233a corresponding to the U-phase and each appended with the cross mark, a slot conductor group made up with slot conductors 233a corresponding to the W-phase and each appended with the filled circle mark, and a slot conductor group made up with slot conductors 233a corresponding to the V-phase and each appended with the cross mark are formed in this order along the direction in which the rotor rotates.

As FIG. 29 clearly indicates, the slot conductor groups 1234 formed in the embodiment, too, satisfy conditions similar to those having been described in reference to the slot conductor groups 234 (see FIG. 11) in the first embodiment. Namely:

(a) the cross conductors 233b connect slot conductors 233a by each running astride slots with the slot pitch Np set to N+1 (=10) on one coil end side and each running astride slots with the slot pitch Np set to N−1 (=8) on the other coil end side, with N (=9) representing the number of slots per pole;

(b) the stator winding includes slot conductor groups 234 each made up with a set of slot conductors 223b corresponding to a single phase, which are inserted through a predetermined number Ns (=5) of consecutive slots forming a continuous range along the circumference of the stator core so as to take up successive slot positions and layer positions; and (c) the predetermined number of slots Ns is set so that Ns=NSPP+NL=5 with NSPP (=3) representing the number of slots per pole per phase when the number of layers is 2×NL (NL=2).

Consequently, the extent of torque ripple can be reduced and thus noise in the rotating electric machine is reduced, thereby ultimately achieving the object of noise reduction in the rotating electric machine, as in the first and second embodiments.

As the number of slots per pole per phase NSPP increases, the orders of high harmonic component that can be eliminated by disposing slot conductors with a one-slot pitch offset as shown in FIG. 12 change. For instance, when NSPP=2, the one-slot pitch is equivalent to 30° in electrical angle. As 30° equals a half cycle of the 6th-order component, the 5th-order induced voltage component and the 7th-order induced voltage component, i.e., the components in orders close to the 6th-order can be diminished, as indicated in FIG. 20. As NSPP is set to an even greater value, as in this embodiment, the one-slot pitch becomes shorter, making it possible to reduce the higher harmonic component of even higher orders. In addition, by reducing the width of the magnetic gaps 258 formed at the rotor core 252, torque ripple higher harmonic components of even higher orders can be reduced and as a result, an even quieter rotating electric machine can be provided.

In addition, the present invention may be adopted to achieve lower noise in a vehicle that utilizes the rotating electric machine described above, a battery that provides DC power and a conversion device that converts the DC power from the battery to AC power and provides the AC power to the rotating electric machine, characterized in that torque generated in the rotating electric machine is used as a drive force, such as the vehicle described in reference to FIGS. 1 and 2.

While the invention has been described in reference to an example in which it is adopted in a 12-pole magnet motor, the present invention is not limited to this example and it may be adopted in a motor with any other number of poles. Furthermore, the present invention may be adopted in motors used in various applications other than vehicular applications. Moreover, the present invention may be adopted in various other types of rotating electric machines, such as generators, instead of motors. As long as the features characterizing the present invention are not compromised, the present invention is by no means limited in any way whatsoever to the particulars of the embodiments described above.

The disclosure of the following priority application is herein incorporated by reference:
Japanese Patent Application No. 2012-8565 filed Jan. 19, 2012.

The invention claimed is:

1. A rotating electric machine, comprising:
a stator core having a plurality of slots formed therein;
a stator winding assuming a plurality of phases, which includes a plurality of coil windings wound with a wave winding pattern, each made up with slot conductors inserted at one of the slots at the stator core to form one of a plurality of layers and cross conductors each connecting same-side ends of slot conductors inserted at different slots so as to form a coil end; and
a rotor rotatably disposed via an air gap so as to be allowed to rotate relative to the stator core, which includes a plurality of magnets and a plurality of magnetic auxiliary salient pole portions each formed between poles formed with the magnets, wherein:
the cross conductors connect the slot conductors so as to run astride slots with a slot pitch Np set to N+1 at coil ends on one side and run astride slots with the slot pitch Np set to N−1 at coil ends on another side, with N representing a number of slots per pole;
the stator winding are arranged into stator winding groups, and each stator winding group comprises a plurality of circumferential windings of the same phase so that there is no phase difference between groups corresponding to a single phase;
the stator winding includes a plurality of slot conductor groups each made up with a plurality of slot conductors corresponding to a single phase;
the plurality of slot conductors in each slot conductor group are inserted at a predetermined number Ns of successive slots forming a continuous range along a circumference of the stator core so that the slot conductors in the slot conductor group take successive slot positions and successive layer positions; and
the predetermined number Ns is set so that Ns=NSPP+NL when NSPP represents a number of slots per pole per phase, NL represents a number of layers, and the number of layers is expressed as 2×NL;
the rotor includes magnetic resistance-altering portions located at positions each offset along a circumferential direction from a q-axis passing through a center of a corresponding magnetic auxiliary salient portion; and
extents to which the magnetic resistance-altering portions are offset from the q-axis vary depending upon positions assumed by magnetic auxiliary salient poles so that torque pulsations occurring in a applying current state cancel each other out.

2. A rotating electric machine according to claim 1, wherein:
the magnetic resistance-altering portions are magnetic gaps.

3. The rotating electric machine according to claim 1, wherein:
the magnetic gaps are set asymmetrically relative to the q-axis passing through a salient pole and symmetrically relative to a d-axis passing through a center of a magnetic pole.

4. The rotating electric machine according to claim 1, wherein:
the magnetic gaps are set symmetrically relative to the q-axis passing through a magnetic pole and asymmetrically relative to a d-axis passing through a center of a salient pole.

5. The rotating electric machine according to claim 3, wherein:
the magnetic gaps are formed by recessed portions formed at a surface of the rotor core.

6. The rotating electric machine according to claim 1, wherein:
the slot conductors are constituted with flat wire.

7. The rotating electric machine according to claim 1, wherein:
the stator winding includes a plurality of Y connections and there is no phase difference manifesting between voltages induced at same-phase windings in the plurality of Y connections.

8. The rotating electric machine according to claim 2, wherein:
the rotor core is formed by laminating magnetic steel sheets, each having holes or notches, which are to constitute the magnetic gaps, formed therein.

9. The rotating electric machine according to claim 8, wherein:
the rotor core is divided into a plurality of axially-split core groups each having the magnets, the magnetic auxiliary salient pole portions and the magnetic gaps, the magnets and the magnetic gaps are disposed with a uniform positional arrangement at the axially-split core groups so that the magnets and the magnetic gaps occupy matching positions along the circumferential direction at the axially-split core groups, and there are at least three axially-split core groups that include at least two different types of axially-split core groups assembled so that the magnetic gaps thereof occupy positions offset relative to each other along the circumferential direction.

10. The rotating electric machine according to claim 1, wherein:
the stator winding adopts a structure that reduces a sixth-order torque ripple component over 360° in electrical angle and a 12th-order torque ripple component is reduced via the magnetic resistance-altering portions.

11. A vehicle, comprising:
a rotating electric machine according to claim 1;
a battery that provides DC power; and
a conversion device that converts the DC power originating from the battery to AC power and provides the AC power to the rotating electric machine, wherein:
torque generated in the rotating electric machine is used as a drive force to drive the vehicle.

* * * * *